(12) United States Patent
Hwang et al.

(10) Patent No.: US 12,505,715 B2
(45) Date of Patent: Dec. 23, 2025

(54) BANKNOTE DEPOSIT AND WITHDRAWAL APPARATUS

(71) Applicant: HYOSUNG TNS INC., Seoul (KR)

(72) Inventors: Jin Yong Hwang, Seoul (KR); Jung Hoon Kang, Gyeonggi-do (KR); Hyun Soo Jang, Gyeonggi-do (KR); Jun Young Kim, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 247 days.

(21) Appl. No.: 18/352,350

(22) Filed: Jul. 14, 2023

(65) Prior Publication Data

US 2024/0221448 A1   Jul. 4, 2024

(30) Foreign Application Priority Data

Dec. 29, 2022 (KR) .................. 10-2022-0188318
Mar. 31, 2023 (KR) .................. 10-2023-0042592

(51) Int. Cl.
*G07D 11/40* (2019.01)
*G07D 11/14* (2019.01)
(Continued)

(52) U.S. Cl.
CPC ............. *G07D 11/40* (2019.01); *G07D 11/14* (2019.01); *G07D 11/18* (2019.01); *G07D 11/50* (2019.01);
(Continued)

(58) Field of Classification Search
CPC ......... G07D 11/14; G07D 11/40; G07D 11/18
See application file for complete search history.

(56) References Cited

U.S. PATENT DOCUMENTS

| 6,474,549 | B2 * | 11/2002 | Katou ............... G07D 11/20 |
| | | | 235/379 |
| 9,646,465 | B2 * | 5/2017 | VanKirk ............ G07D 11/14 |
| 2021/0319643 | A1 * | 10/2021 | Baranowski ........ G07D 11/14 |

FOREIGN PATENT DOCUMENTS

KR   20110104645 A  *  9/2011  ............. G07F 19/20

* cited by examiner

*Primary Examiner* — Jeremy R Severson
(74) *Attorney, Agent, or Firm* — BACON&THOMAS,PLLC

(57) ABSTRACT

A banknote deposit and withdrawal apparatus according to an embodiment includes a deposit and withdrawal part having a space, through which a banknote is inserted or received during deposit and withdrawal, a deposit banknote discrimination section that discriminates a type and abnormality of a deposit banknote by a plurality of sensors provided on a transportation path along which the banknote deposited through the deposit and withdrawal part is transported, a temporary holding part provided on one side of the deposit and withdrawal part and having a drum-shaped structure in which the banknote discriminated as a non-reflux banknote in the deposit banknote discrimination section is temporarily stored, a rejection part provided on one side of the temporary holding part and having a drum-shaped structure in which the banknote discriminated as a deposit rejection banknote in the deposit banknote discrimination section is temporarily stored, a deposit-dedicated cassette which stores the non-reflux banknote, which is temporarily stored in the temporary holding part, transported thereto when the deposit is received, a plurality of reflux cassettes which are stacked at a lower side of the deposit-dedicated cassette and in which the banknote discriminated as a reflux banknote in the deposit banknote discrimination section is stored separately according to the type of the (Continued)

banknote, and the transportation path along which the deposited or withdrawn banknote is transported.

17 Claims, 18 Drawing Sheets

(51) Int. Cl.
 *G07D 11/18* (2019.01)
 *G07D 11/50* (2019.01)
 G07D 11/245 (2019.01)
(52) U.S. Cl.
 CPC ....... *G07D 11/245* (2019.01); *G07D 2207/00* (2013.01); *G07D 2211/00* (2013.01)

[FIG. 1]
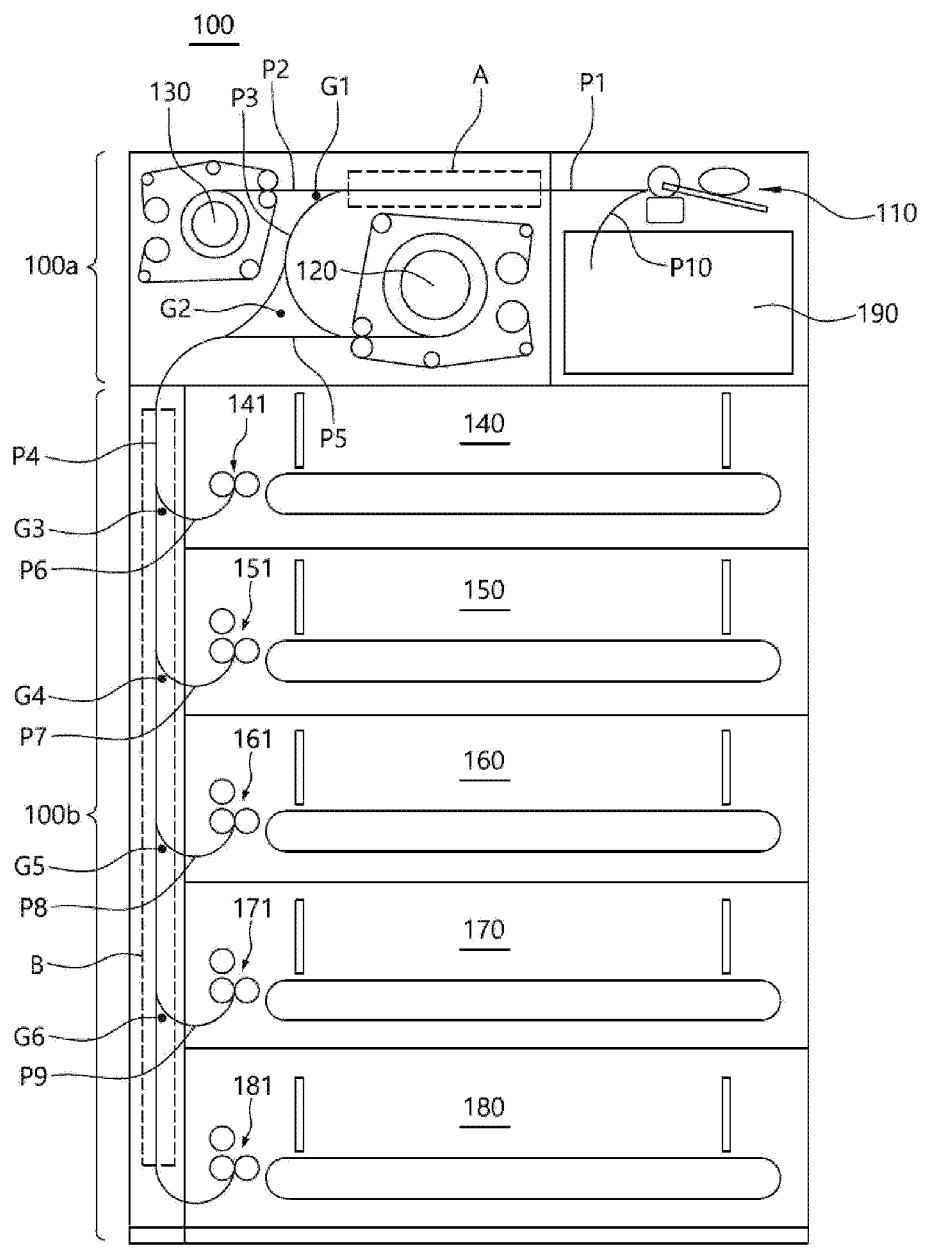

[FIG. 2]
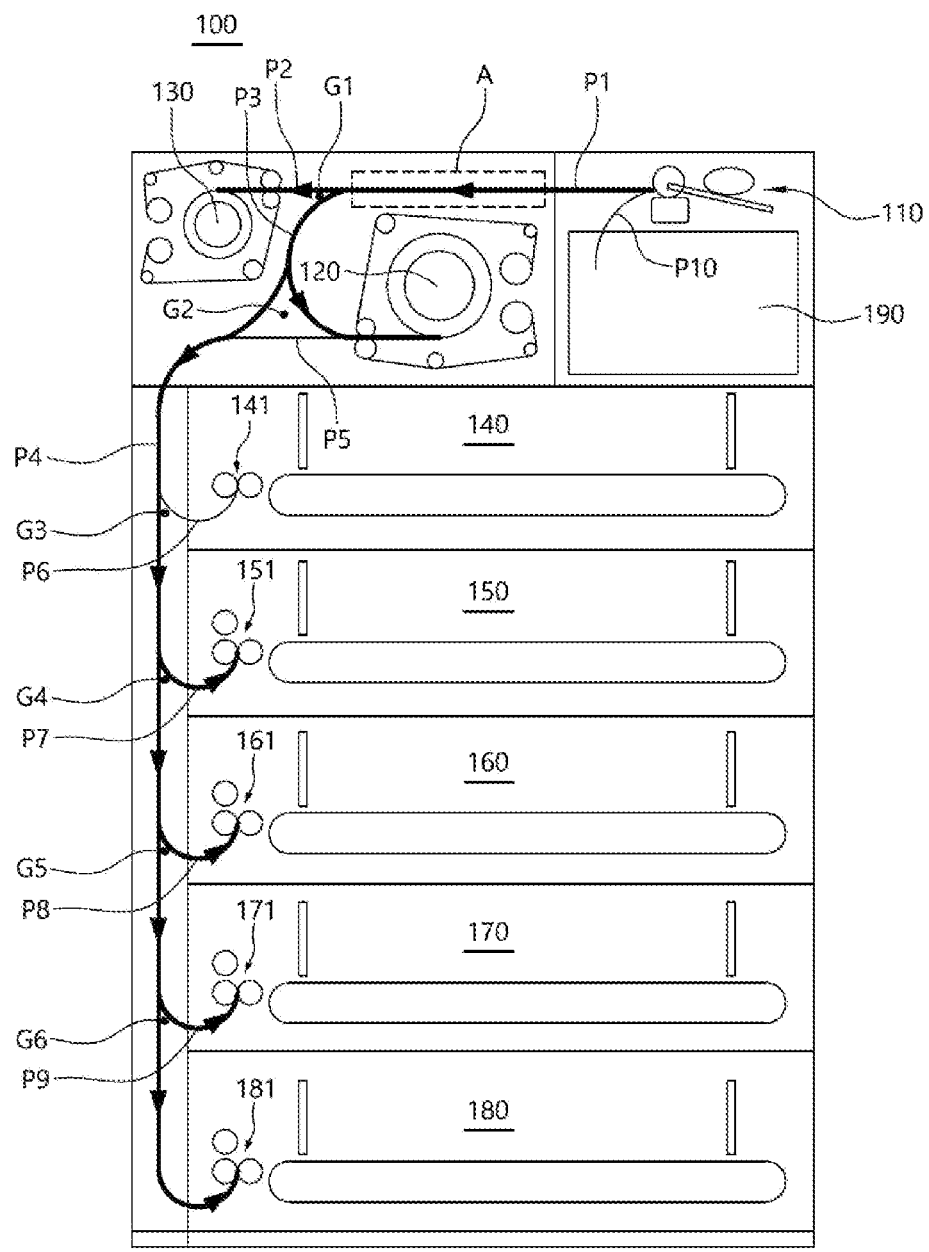

[FIG. 3]
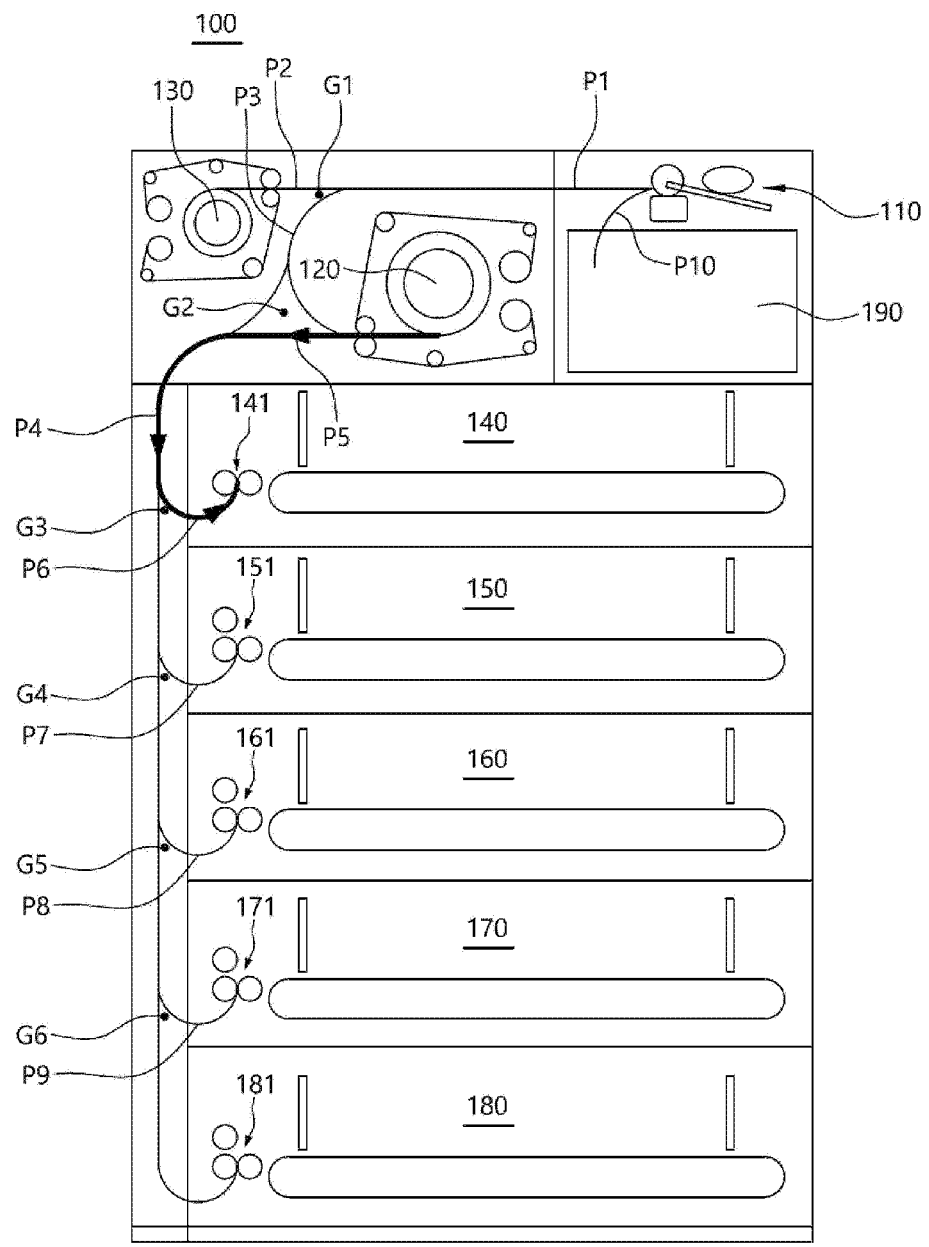

[FIG. 4]
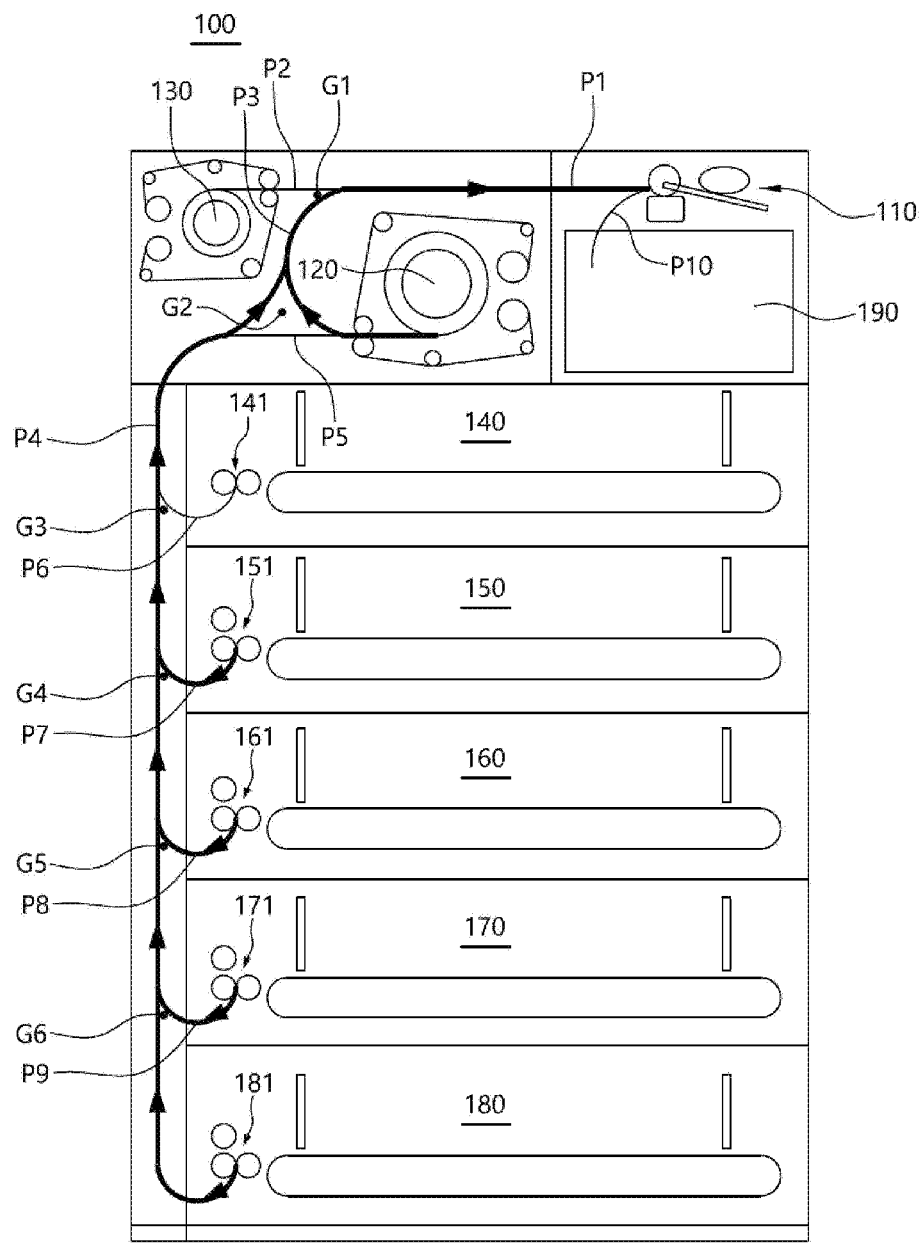

[FIG. 5]
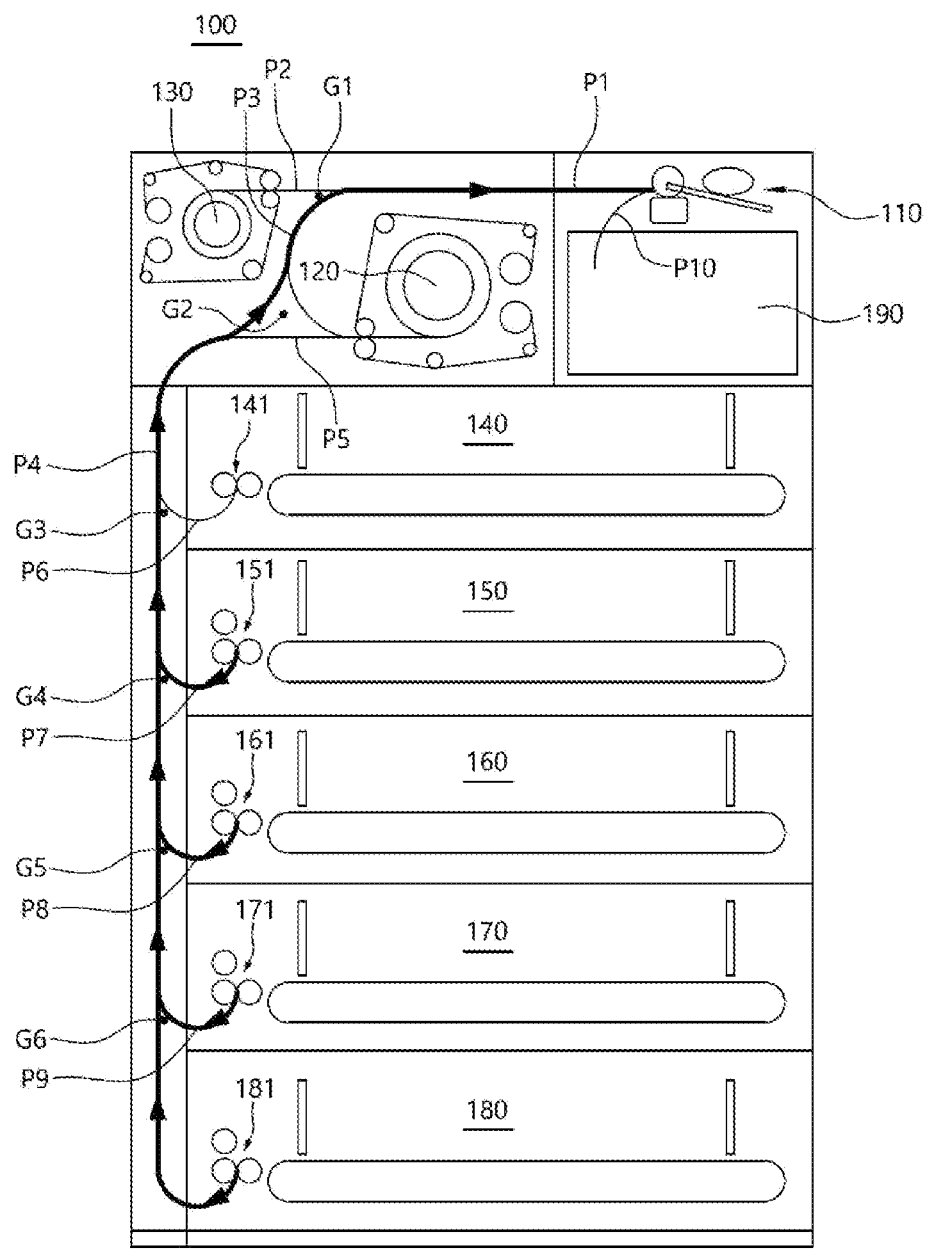

[FIG. 6]
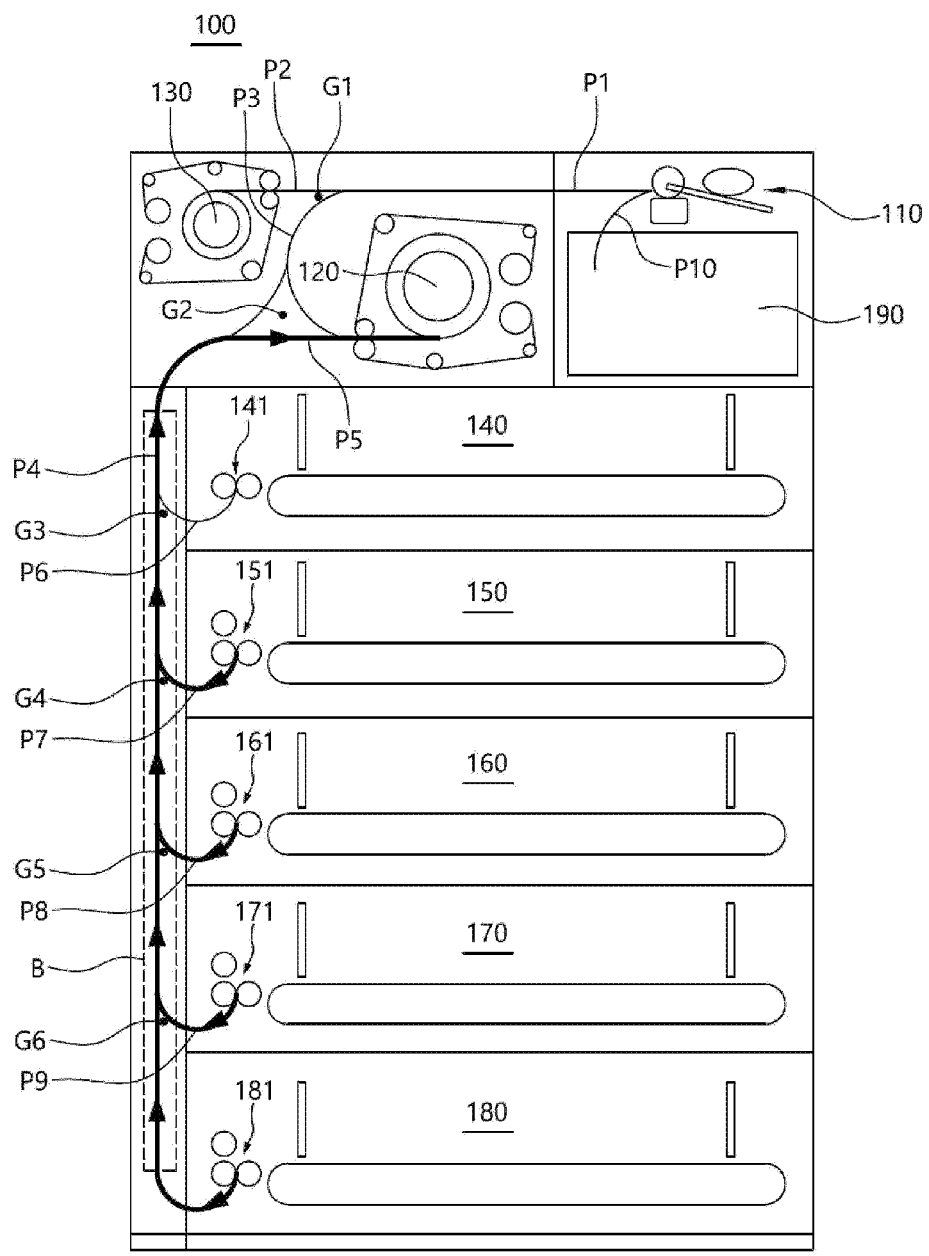

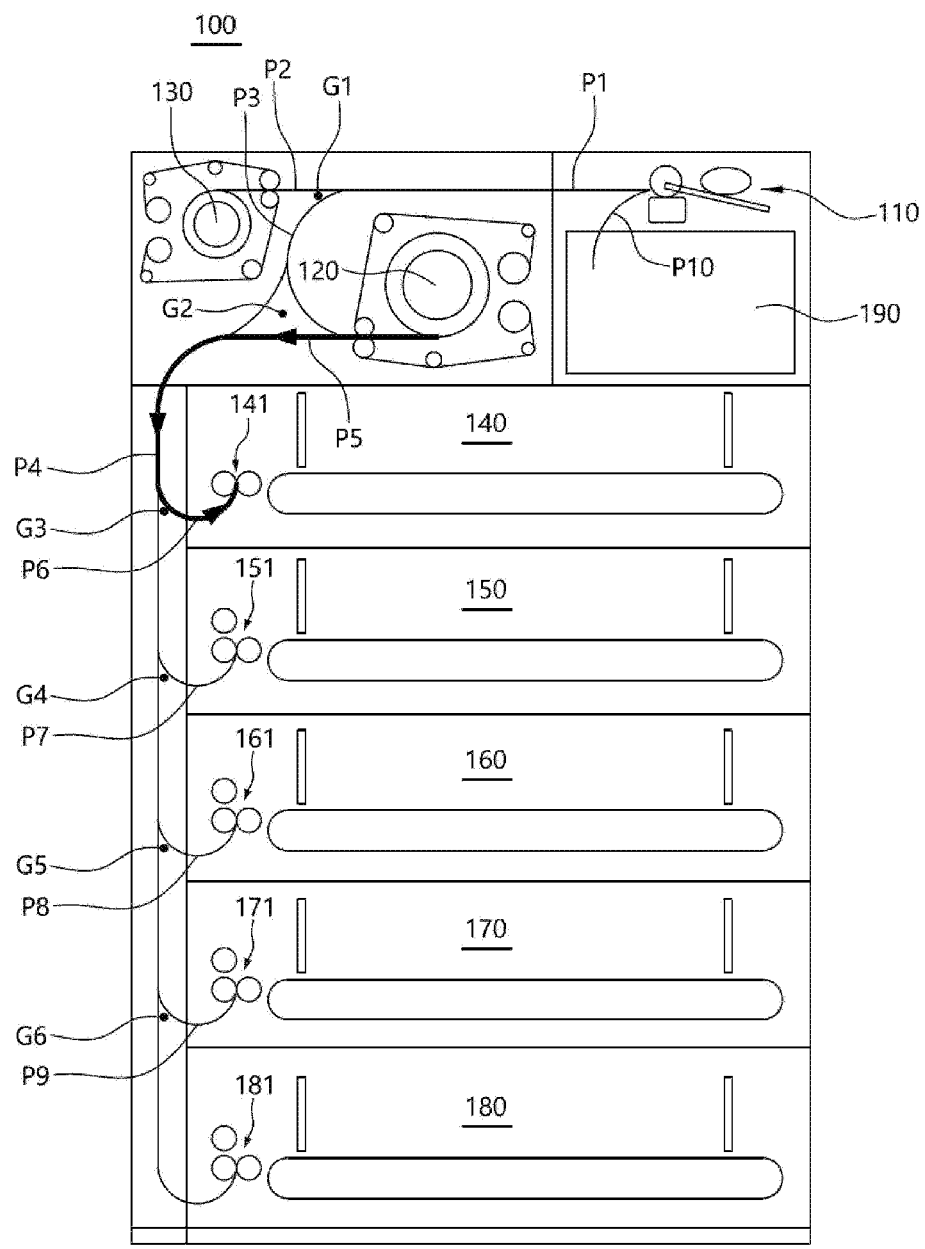
[FIG. 7]

[FIG. 8]
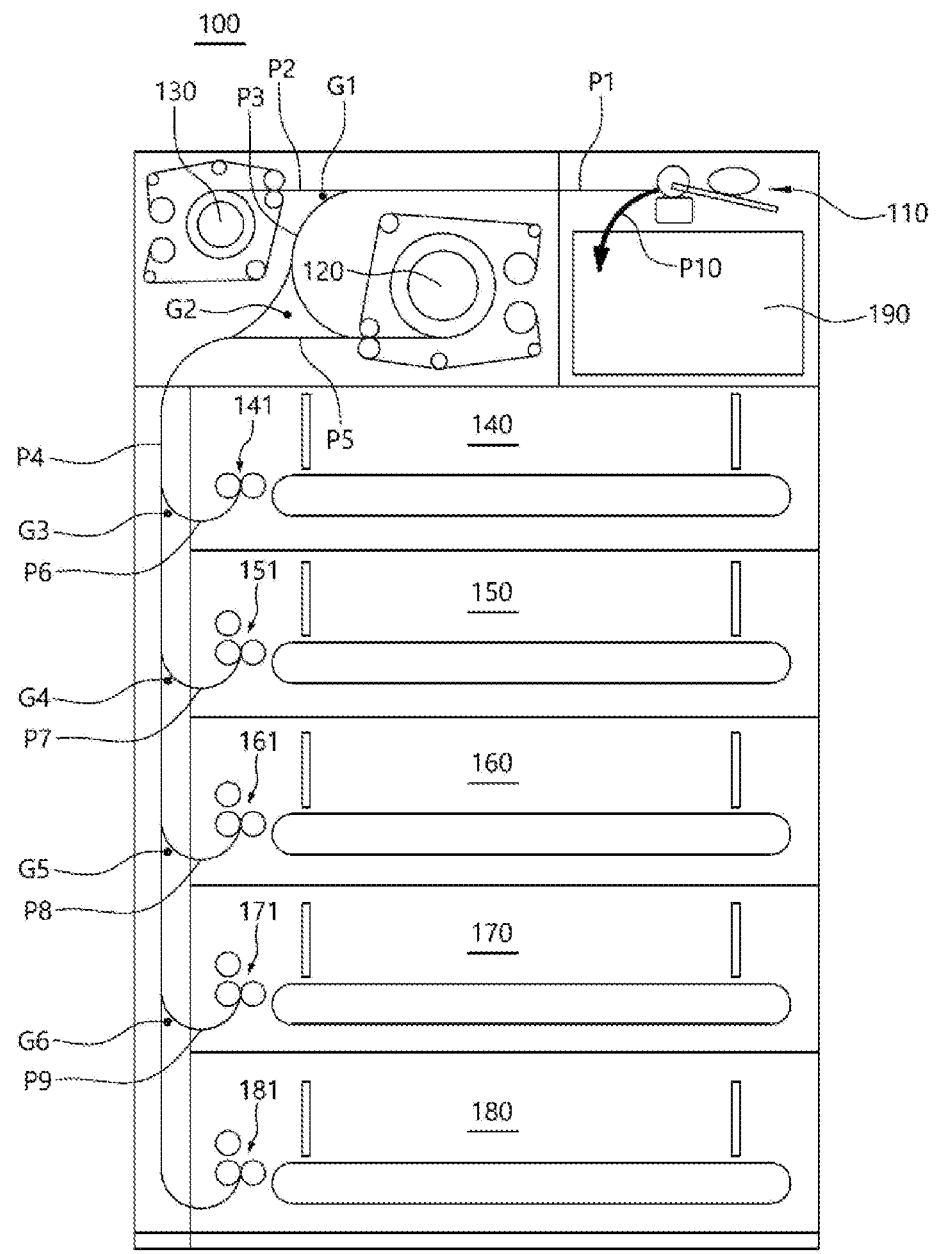

[FIG. 9]
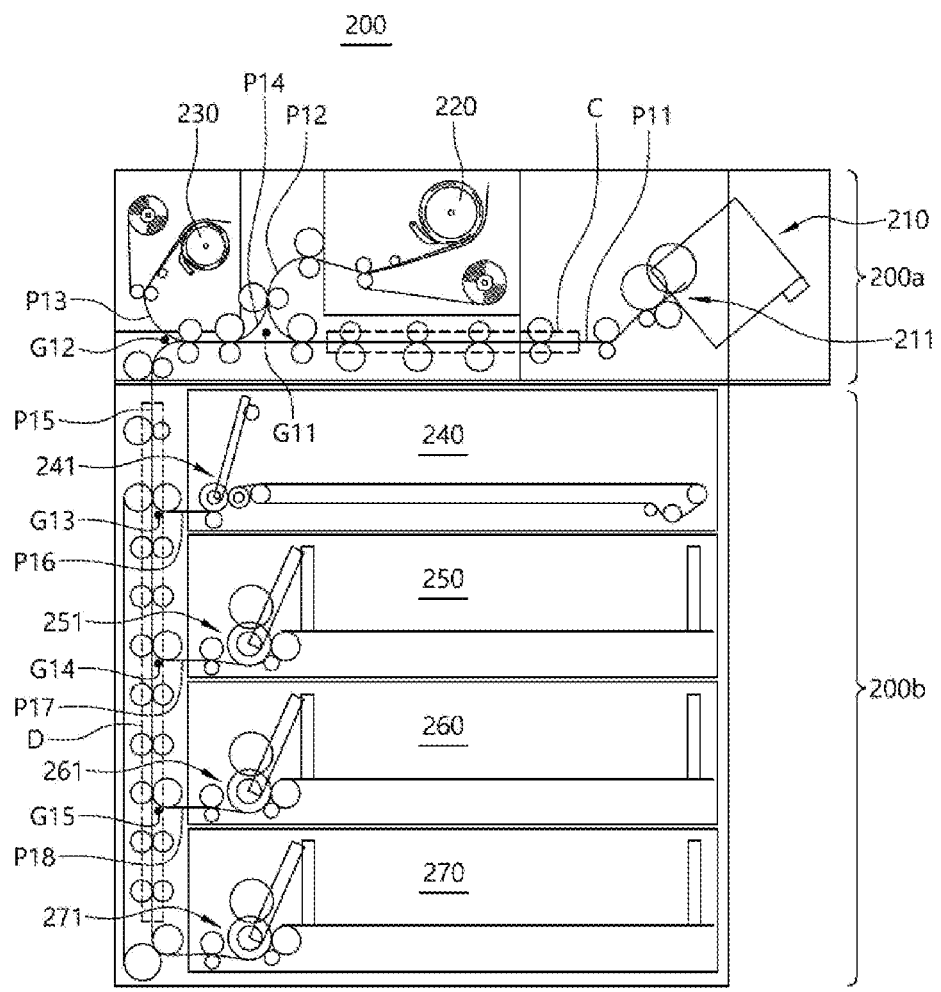

[FIG. 10]
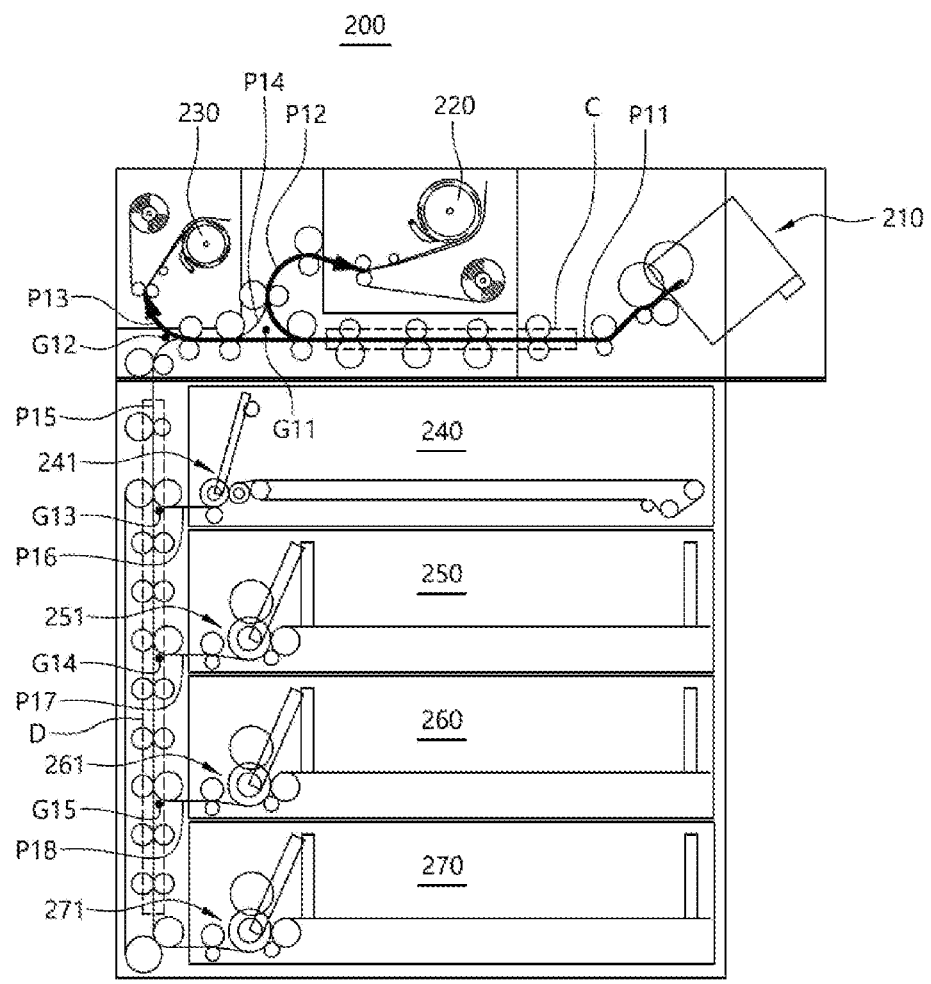

[FIG. 11]
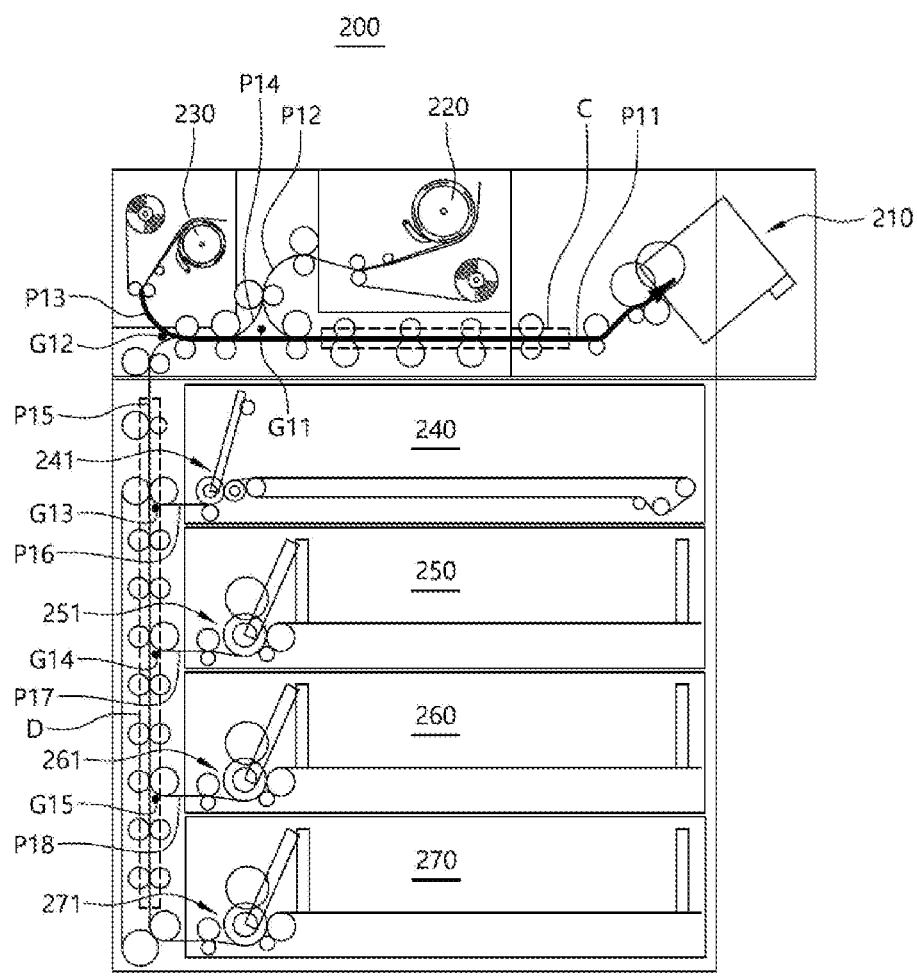

[FIG. 12]
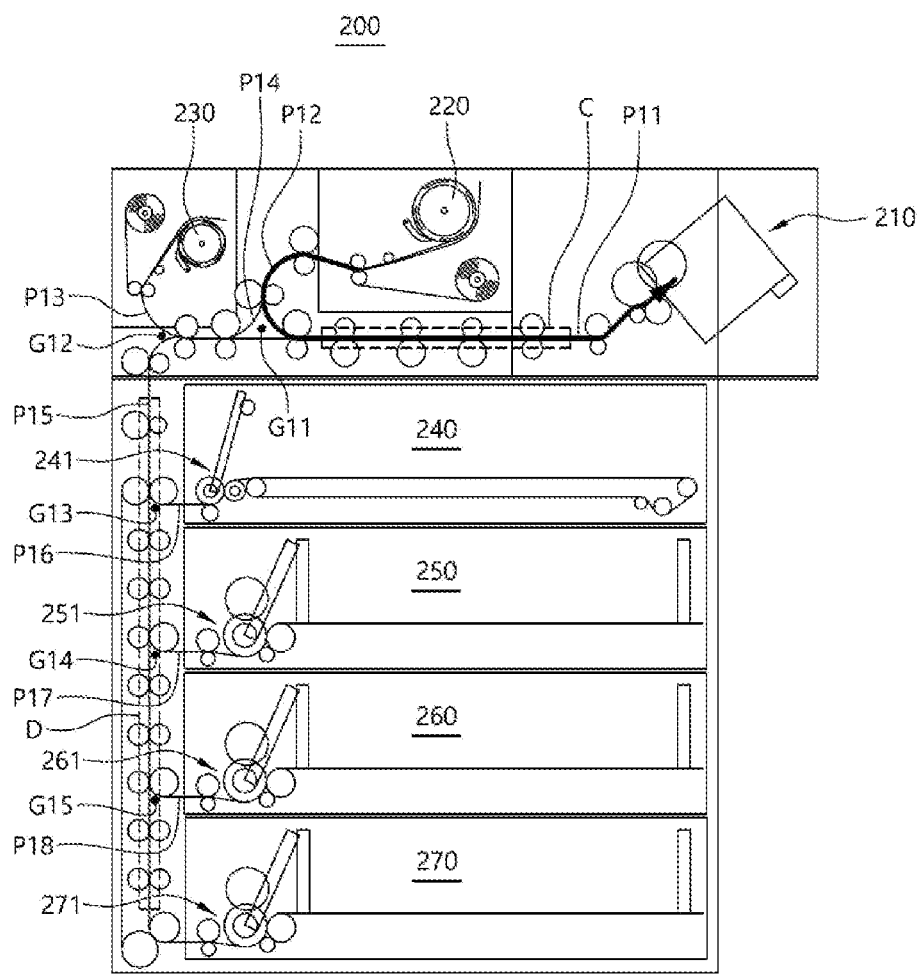

[FIG. 13]
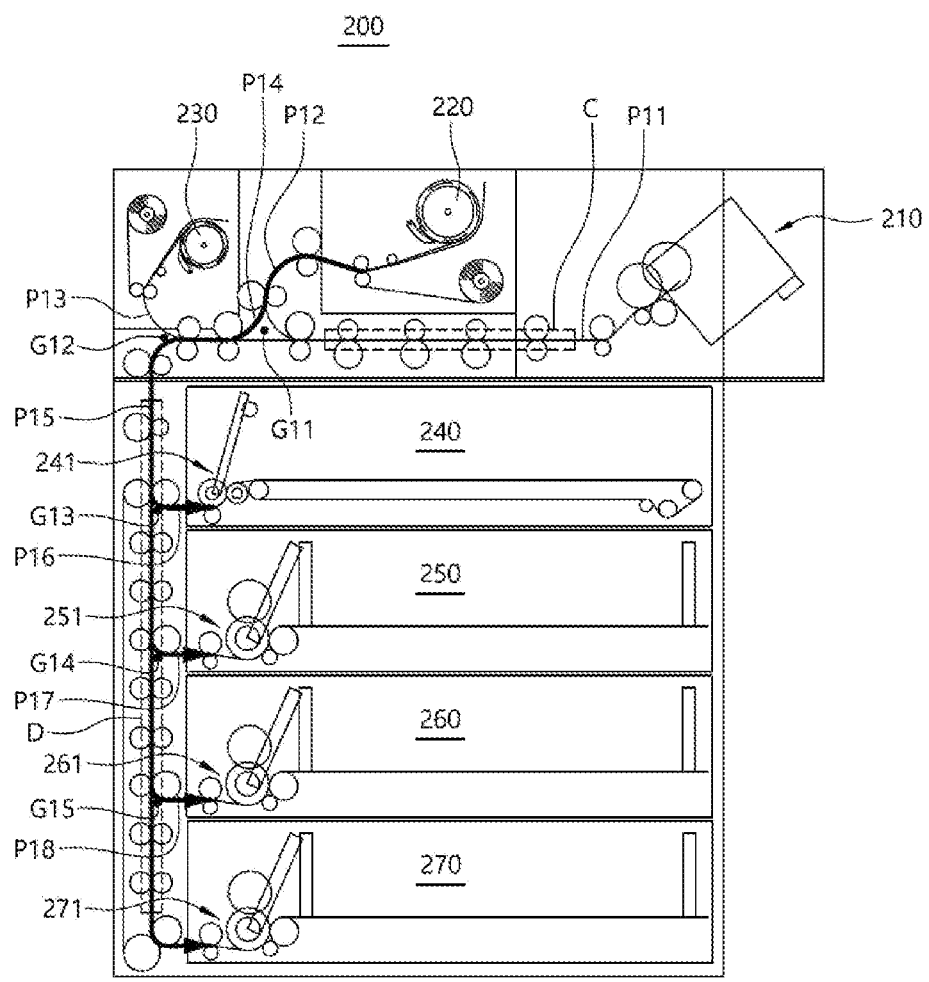

[FIG. 14]
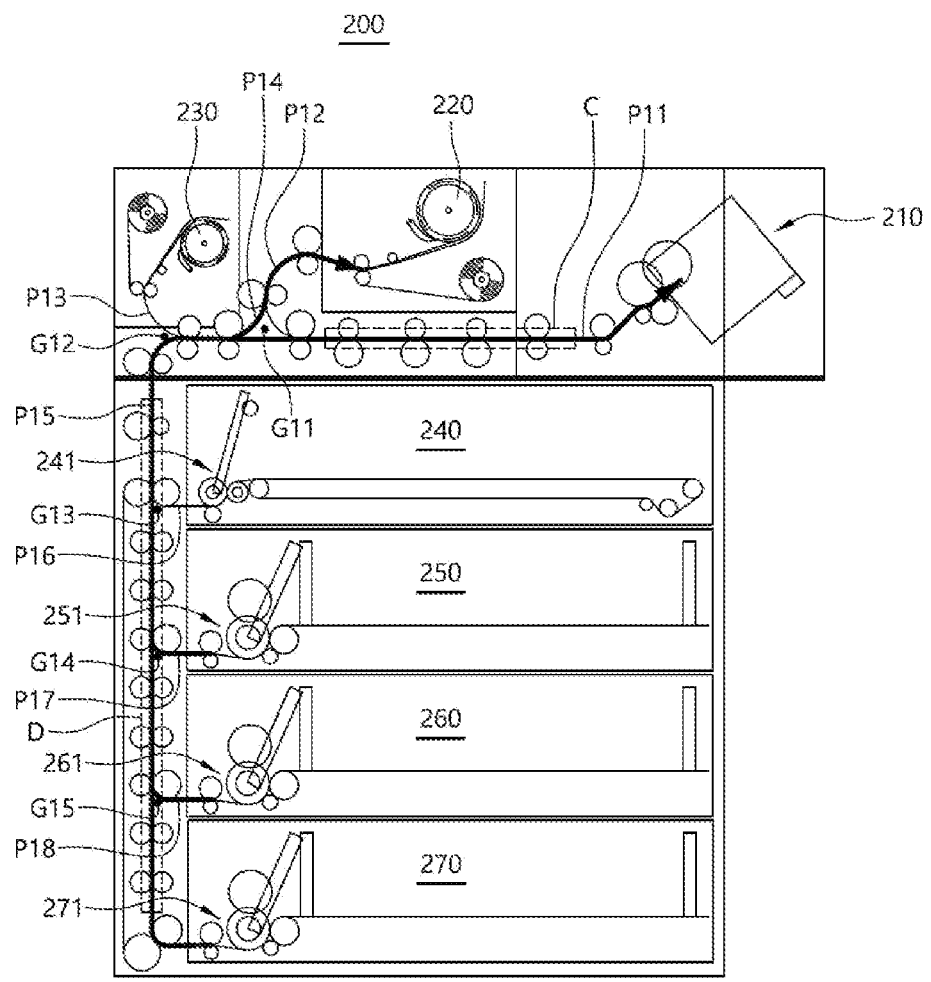

[FIG. 15]
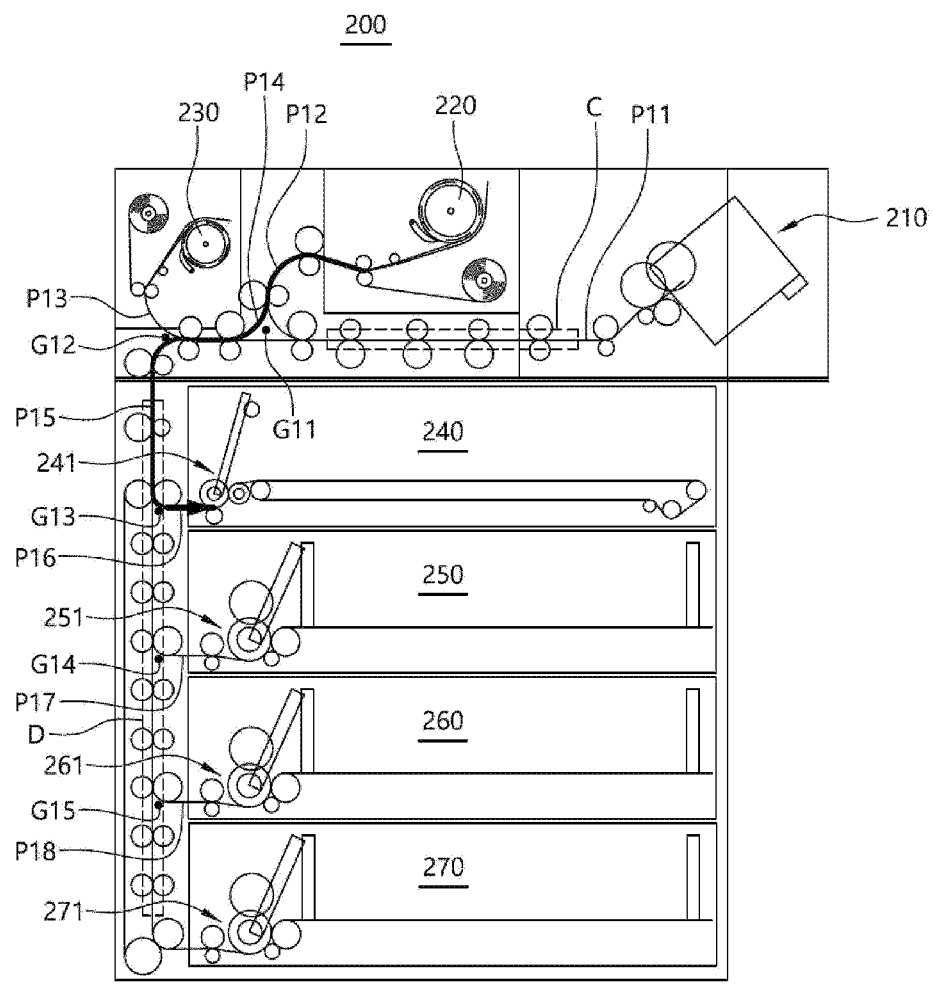

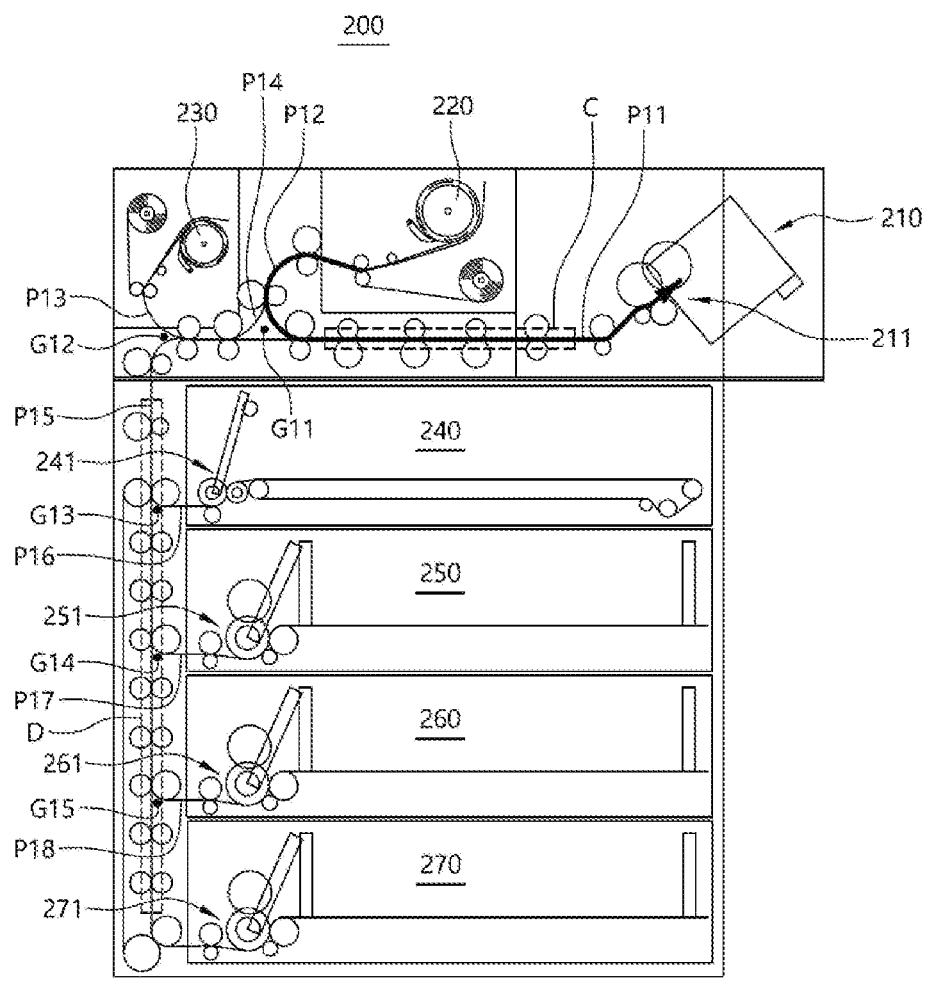
[FIG. 16]

[FIG. 17]
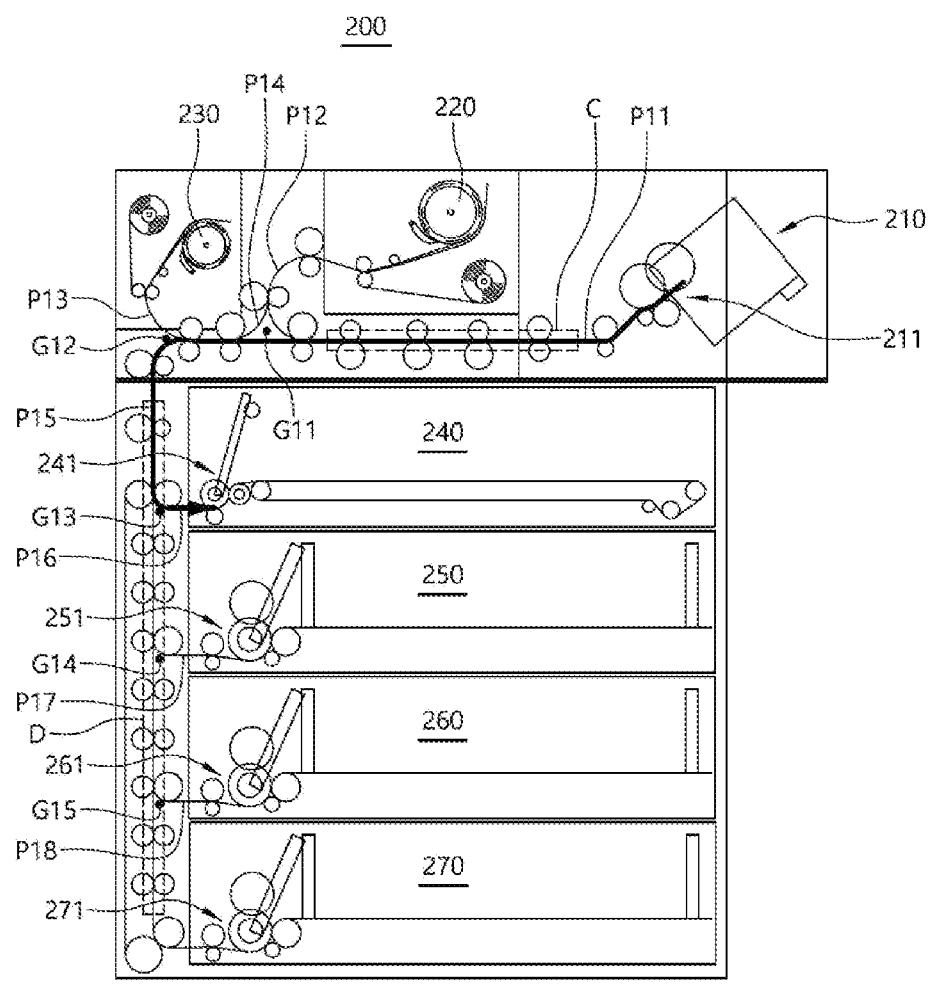

[FIG. 18]
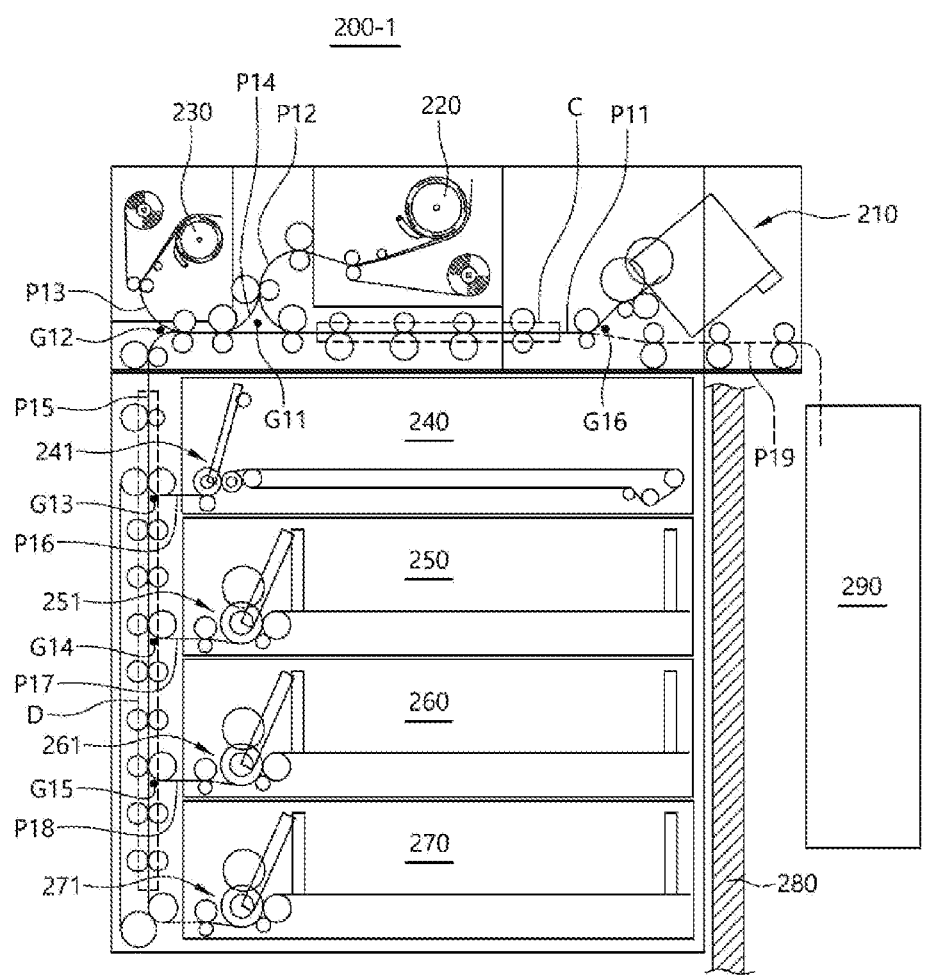

BANKNOTE DEPOSIT AND WITHDRAWAL APPARATUS

BACKGROUND

1. Field of the Invention

The present disclosure relates to a banknote deposit and withdrawal apparatus, and more particularly, to a banknote deposit and withdrawal apparatus that performs deposit and withdrawal while distinguishing a reflux banknote and a non-reflux banknote from each other and as well as has a separate a temporary holding part and a separate rejection part separated from a banknote storage part.

2. Discussion of Related Art

Financial automation machines are automated apparatuses that may assist basic financial services such as deposit or withdrawal without a bank employee regardless of a location and time in relation to financial services.

The financial automation machines may be classified into a banknote withdrawal apparatus and a banknote deposit and withdrawal apparatus according to whether deposits and withdrawals are performed, and recently, have been used for various purposes such as depositing and withdrawing banknotes, depositing and withdrawing checks, organizing bankbooks, paying giro fees, and issuing tickets.

In this way, among the financial automation machines according to the related art, the banknote deposit and withdrawal apparatus used in a bank includes various functions, but has a complex structure and high manufacturing costs, and thus are not suitable for use in retail markets such as convenience stores and large marts.

In particular, a transport path provided in the banknote deposit and withdrawal apparatus according to the related art has a long length and a complicated structure, a plurality of modules for individually performing various functions are included in the apparatus, and thus a volume of the apparatus can increase and a structure cannot be simplified.

Further, in the case of a banknote deposit and withdrawal apparatus having a temporary holding part having a drum-shaped structure according to the related art, when a withdrawal rejection banknote is rolled up while two or more sheets overlap each other and is temporarily stored in the temporary holding part, the number of rejection banknotes stored in the temporary holding part cannot be accurately identified. Thus, after the rejection banknote is withdrawn from the temporary holding part and is stored in a rejection banknote storage cassette, the rejection banknotes are processed as inaccurate banknotes of which the number is not accurate, and thus operation of the banknote deposit and withdrawal apparatus is inconvenient.

The related art related to the banknote deposit and withdrawal apparatus is disclosed in Korean Registration Patent No. 10-1133008.

SUMMARY OF THE INVENTION

The present disclosure is directed to providing a banknote deposit and withdrawal apparatus having a simplified structure and reduced manufacturing costs so that the banknote deposit and withdrawal apparatus is suitable for installation and use in retail markets such as convenience stores and large marts.

According to an aspect of the present invention, there is provided a banknote deposit and withdrawal apparatus comprising: a deposit and withdrawal part having a space through which a banknote is inserted or received during deposit and withdrawal; a deposit banknote discrimination section configured to discriminate a type and abnormality of a deposit banknote by a plurality of sensors provided on a transportation path along which the banknote deposited through the deposit and withdrawal part is transported; a temporary holding part provided on one side of the deposit and withdrawal part and having a drum-shaped structure in which the banknote discriminated as a non-reflux banknote in the deposit banknote discrimination section is temporarily stored; a rejection part provided on one side of the temporary holding part and having a drum-shaped structure in which the banknote discriminated as a deposit rejection banknote in the deposit banknote discrimination section is temporarily stored; a deposit-dedicated cassette which store the non-reflux banknote, which is temporarily stored in the temporary holding part, transported thereto when the deposit is received; a plurality of reflux cassettes which are stacked at a lower side of the deposit-dedicated cassette and in which the banknote discriminated as a reflux banknote in the deposit banknote discrimination section is stored separately according to the type of the banknote; and the transportation path along which the deposited or withdrawn banknote is transported.

The banknote deposit and withdrawal apparatus further comprising: a withdrawal banknote discrimination section configured to discriminate whether a withdrawal banknote withdrawn from the plurality of reflux cassettes is abnormal by the plurality of sensors on the transportation path along which the withdrawal banknote is transported, wherein the banknote discriminated as a withdrawal rejection banknote in the withdrawal banknote discrimination section is temporarily stored in the temporary holding part and is transported to and stored in the deposit-dedicated cassette after a normal banknote is completely withdrawn.

The banknote deposit and withdrawal apparatus, wherein the transportation path includes: a first transportation path along which the deposit banknote inserted into the deposit and withdrawal part or a withdrawal banknote extracted from the deposit and withdrawal part is transported and which is provided in a transverse direction; a second transportation path connected to the rejection part from the first transportation path; a third transportation path branching off at a branching point between the first transportation path and the second transportation path and connected to the temporary holding part; a fourth transportation path branching off from the third transportation path and provided in a longitudinal direction to be connected to one sides of the deposit-dedicated cassette and the plurality of reflux cassettes; and a fifth transportation path branching off from the fourth transportation path and connected to the third transportation path on one side of the temporary holding part.

The banknote deposit and withdrawal apparatus, wherein, during a deposit counting operation, the banknote inserted into the deposit and withdrawal part and transported through the first transportation path is classified into a reflux banknote and a non-reflux banknote, the banknote discriminated as the non-reflux banknote in the deposit banknote discrimination section is transported along the third transportation path and is temporarily stored in the temporary holding part, the banknote discriminated as the reflux banknote in the deposit banknote discrimination section is transported along the third transportation path and the fourth transportation path and is stored in the plurality of reflux cassettes, and when the reflux banknote is completely stored, the non-reflux banknote temporarily stored in the temporary holding part is transported along the fifth transportation path and the fourth transportation path and is stored in the deposit-dedicated cassette.

The banknote deposit and withdrawal apparatus, wherein, during a deposit counting operation, the banknote discriminated as the deposit rejection banknote in the deposit banknote discrimination section is transported along the second transportation path and is temporarily stored in the rejection part, and after the deposit counting operation is completed, the deposit rejection banknote temporarily stored in the rejection part is transported along the second transportation path and the first transportation path to the deposit and withdrawal part.

The banknote deposit and withdrawal apparatus, further comprising a withdrawal banknote discrimination section configured to discriminate whether the withdrawal banknote withdrawn from the plurality of reflux cassettes is abnormal by the plurality of sensors on the transportation path along which the withdrawal banknote is transported, wherein, when the banknote is withdrawn from the plurality of reflux cassettes, the banknote discriminated as a withdrawal rejection banknote in the withdrawal banknote discrimination section is transported along the fourth transportation path and the fifth transportation path and is temporarily stored in the temporary holding part, and when a normal banknote is completely withdrawn, the withdrawal rejection banknote temporarily stored in the temporary holding part is transported along the fifth transportation path and the fourth transportation path and is store in the deposit-dedicated cassette.

The banknote deposit and withdrawal apparatus, wherein a retraction part, in which the banknote that is withdrawal to the deposit and withdrawal part and then is not received is collected and stored, is provided below the deposit and withdrawal part.

The banknote deposit and withdrawal apparatus, wherein the temporary holding part temporarily stores the non-reflux banknote and the reflux banknote discriminated as a deposit normal banknote in the deposit banknote discrimination section, and when the deposit is received, the reflux banknote among the deposit normal banknote temporarily stored in the temporary holding part is transported to the plurality of reflux cassettes and is stored in the plurality of reflux cassettes according to the type of the banknote.

The banknote deposit and withdrawal apparatus, wherein the temporary holding part and the rejection part are disposed at both sides to be spaced apart from each other at the same height.

The banknote deposit and withdrawal apparatus, comprising a withdrawal banknote discrimination section configured to discriminate whether a withdrawal banknote withdrawn from the plurality of reflux cassettes is abnormal by the plurality of sensors on the transportation path along which the withdrawal banknote is transported, wherein the banknote discriminated as a withdrawal rejection banknote in the withdrawal banknote discrimination section is temporarily stored in the temporary holding part and is transported to and stored in the deposit-dedicated cassette after a withdrawal normal banknote is completely withdrawn, and when the withdrawal rejection banknote is processed, the withdrawal rejection banknote temporarily stored in the temporary holding part is extracted from the temporary holding part, is transported to the deposit and withdrawal part, is separated from the deposit and withdrawal part one by one, passes through the deposit banknote discrimination section, and then is transported to and stored in the deposit-dedicated cassette after the number of withdrawal rejection banknotes is counted.

The banknote deposit and withdrawal apparatus, wherein the transportation path includes: a $11^{th}$ transportation path along which the deposit banknote inserted into the deposit and withdrawal part or a withdrawal banknote extracted from the deposit and withdrawal part is transported and which is provided in a transverse direction; a $12^{th}$ transportation path connected to the temporary holding part from the $11^{th}$ transportation path; a $13^{th}$ transportation path branching off at a branching point between the $11^{th}$ transportation path and the $12^{th}$ transportation path and connected to the rejection part; a $14^{th}$ transportation path branching off at a branching point between the $11^{th}$ transportation path and the $13^{th}$ transportation path and connected to the temporary holding part; and a $15^{th}$ transportation path branching off from the $13^{th}$ transportation path and provided in a longitudinal direction to be connected to one sides of the deposit-dedicated cassette and the plurality of reflux cassettes.

The banknote deposit and withdrawal apparatus, wherein, during a deposit counting operation, the banknote inserted into the deposit and withdrawal part and transported along the $11^{th}$ transportation path is discriminated as a deposit normal banknote or a deposit rejection banknote while passing through the deposit banknote discrimination section, and at the same time, the deposit normal banknote is discriminated as a reflux banknote and a non-reflux banknote, the banknote discriminated as the deposit normal banknote in the deposit banknote discrimination section is transported along the $12^{th}$ transportation path and is temporarily stored in the temporary holding part, and the banknote discriminated as the deposit rejection banknote in the deposit banknote discrimination section is transported along the $13^{th}$ transportation path and is temporarily stored in the rejection part.

The banknote deposit and withdrawal apparatus, wherein when the deposit is rejected, the deposit rejection banknote temporarily stored in the rejection part is transported along the 13th transportation path and the 11th transportation path to the deposit and withdrawal part after the deposit counting operation is completed, and when the deposit is received, the non-reflux banknote temporarily stored in the temporary holding part is transported along the $14^{th}$ transportation path and the $15^{th}$ transportation path and stored in the deposit-dedicated cassette, and the reflux banknote temporarily stored in the temporary holding part is transported along the $14^{th}$ transportation path and the $15^{th}$ transportation path and is stored separately according to a type of the banknote.

The banknote deposit and withdrawal apparatus, further comprising a withdrawal banknote discrimination section configured to discriminate whether the withdrawal banknote withdrawn from the plurality of reflux cassettes is abnormal by a plurality of sensors on the transportation path along which the withdrawal banknote is transported, wherein, when the banknote is withdrawn from the plurality of reflux cassettes, the banknote discriminated as a withdrawal normal banknote in the withdrawal banknote discrimination section is transported along the $15^{th}$ transportation path and the $11^{th}$ transportation path and is withdrawn to the deposit and withdrawal part, and the banknote discriminated as a withdrawal rejection banknote in the withdrawal banknote discrimination section is transported along the $15^{th}$ transportation path and the $14^{th}$ transportation path and is temporarily stored in the temporary holding part.

The banknote deposit and withdrawal apparatus, wherein, when the withdrawal normal banknote is completely withdrawn, the withdrawal rejection banknote temporarily stored in the temporary holding part is transported along the 14$^{th}$ transportation path and the 15$^{th}$ transportation path and is stored in the deposit-dedicated cassette.

The banknote deposit and withdrawal apparatus, wherein, when the withdrawal normal banknote is completely withdrawn, the withdrawal rejection banknote temporarily stored in the temporary holding part is transported to the deposit and withdrawal part along the 12$^{th}$ transportation path and the 11$^{th}$ transportation path, is separated from the deposit and withdrawal part one by one, passes through the deposit banknote discrimination section along the 11$^{th}$ transportation path, is transported along the 15$^{th}$ transportation path after the number of withdrawal rejection banknotes is counted, and then is stored in the deposit-dedicated cassette.

The banknote deposit and withdrawal apparatus, wherein the deposit-dedicated cassette and the reflux cassette are accommodated in a safe, a transit cassette configured to perform at least one function of replenishment, collection, and settlement of the banknote between the deposit-dedicated cassette and the reflux cassette is provided outside the safe, and the transportation path includes a transit transportation path which connects the deposit-dedicated cassette and the reflux cassette and the transit cassette and through which the banknote is transported.

The banknote deposit and withdrawal apparatus, wherein the reflux banknote is set as a type of a relatively low-value banknote as compared to the non-reflux banknote, and the non-reflux banknote is set as a type of a relatively high-value banknote as compared to the reflux banknote.

The banknote deposit and withdrawal apparatus, wherein the deposit-dedicated cassette and the plurality of reflux cassettes are vertically stacked and are extracted or received in a transverse direction.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a diagram of a banknote deposit and withdrawal apparatus according to a first embodiment of the present disclosure:

FIG. 2 is a view illustrating a transportation path of a banknote during a deposit counting operation and a deposit rejection operation in the banknote deposit and withdrawal apparatus according to the first embodiment of the present disclosure;

FIG. 3 is a view illustrating a transportation path of a banknote during a non-reflux banknote deposit and reception operation in the banknote deposit and withdrawal apparatus according to the first embodiment of the present disclosure:

FIG. 4 is a view illustrating a transportation path of a banknote during a deposit cancellation and return operation in the banknote deposit and withdrawal apparatus according to the first embodiment of the present disclosure:

FIG. 5 is a view illustrating a transportation path of a banknote during a withdrawal operation in the banknote deposit and withdrawal apparatus according to the first embodiment of the present disclosure:

FIGS. 6 and 7 are views illustrating a transportation path of a banknote during a withdrawal rejection operation in the banknote deposit and withdrawal apparatus according to the first embodiment of the present disclosure:

FIG. 8 is a view illustrating a transportation path of a banknote during a collection operation of an untaken banknote in the banknote deposit and withdrawal apparatus according to the first embodiment of the present disclosure;

FIG. 9 is a diagram of a banknote deposit and withdrawal apparatus according to a second embodiment of the present disclosure:

FIG. 10 is a view illustrating a transportation path of a banknote during a deposit counting operation in the banknote deposit and withdrawal apparatus according to the second embodiment of the present disclosure:

FIG. 11 is a view illustrating a transportation path of a banknote during a deposit rejection operation banknote in the banknote deposit and withdrawal apparatus according to the second embodiment of the present disclosure:

FIG. 12 is a view illustrating a transportation path of a banknote during a deposit cancellation and return operation in the banknote deposit and withdrawal apparatus according to the second embodiment of the present disclosure:

FIG. 13 is a view illustrating a transportation path of a banknote during a deposit reception operation in the banknote deposit and withdrawal apparatus according to the second embodiment of the present disclosure;

FIG. 14 is a view illustrating a transportation path of a banknote during a withdrawal operation in the banknote deposit and withdrawal apparatus according to the second embodiment of the present disclosure:

FIG. 15 is a view illustrating a transportation path of a banknote during a withdrawal rejection operation in the banknote deposit and withdrawal apparatus according to the second embodiment of the present disclosure;

FIG. 16 is a view illustrating a transportation path of a banknote, through which a banknote extracted from a temporary holding part is transported to a banknote deposit and withdrawal part during a number identification operation for a withdrawal rejection banknote, in the banknote deposit and withdrawal apparatus according to the second embodiment of the present disclosure:

FIG. 17 is a view illustrating a transportation path of a banknote that is separated from a deposit and withdrawal part in parts of sheets, is counted while passing through a deposit banknote discrimination section, and then is transported to a deposit-dedicated cassette, during the number identification operation for the withdrawal rejection banknote in the banknote deposit and withdrawal apparatus according to the second embodiment of the present disclosure; and FIG. 18 is a diagram of a banknote deposit and withdrawal apparatus according to a third embodiment of the present disclosure.

DETAILED DESCRIPTION OF EXEMPLARY EMBODIMENTS

Hereinafter, configurations and operations of exemplary embodiments of the present disclosure will be described in detail with reference to the accompanying drawings.

First Embodiment

Referring to FIG. 1, a banknote deposit and withdrawal apparatus 100 according to a first embodiment of the present disclosure includes an upper module 100a by which a banknote is deposited and withdrawn and a non-reflux banknote and a rejection banknote are temporarily held and a banknote storage part 100b that is stacked under the upper module 100a and stores multi-currency banknotes while the banknotes are classified into non-reflux banknotes and reflux banknotes.

The upper module 100a includes a deposit and withdrawal part 110, a deposit banknote discrimination section A, a temporary holding part 120, a rejection part 130, and a retraction part 190.

The banknote storage part 100b has a structure in which a deposit-dedicated cassette 140 and a plurality of reflux cassettes 150, 160, 170, and 180 are vertically stacked.

Further, transportation paths P1 to P10 that connect the components and provide paths through which a banknote is transported are included.

The deposit and withdrawal part 110 having a space, through which a banknote is inserted or received during deposit and withdrawal, is provided in an integrated structure on a right side of the upper module 100a. The deposit and withdrawal part 110 may be provided with a space through which a deposit banknote is injected and a deposit rejection banknote is returned during the deposit and a withdrawal banknote is received during the withdrawal. In this way, the deposit and withdrawal part 110 may have an integrated deposit part and withdrawal part, perform a deposit operation and a withdrawal operation using one integrated module, and thus simplify a configuration of the apparatus.

The retraction part 190, in which an untaken banknote that is not taken by a customer after the banknote is withdrawn to the deposit and withdrawal part 110 is collected and stored, is provided below the deposit and withdrawal part 110.

The deposit banknote discrimination section A discriminates the type and abnormality of the deposit banknote by a plurality of sensors (not illustrated) provided on the transportation path P1 through which the deposit banknote is transported, classifies the deposit banknote into a normal banknote and a rejection banknote according to the discrimination result, and classifies the normal banknote into the non-reflux banknote and the reflux banknote, which are transported to and stored in corresponding storages.

An optical sensor, a magnetic sensor, an ultraviolet sensor, or an infrared sensor may be used in the deposit banknote discrimination section A.

Here, the rejection banknote refers to a banknote that cannot be deposited and may include old banknotes, folded banknotes, counterfeit banknotes, and the like of which an image cannot be identified.

The non-reflux banknote refers to a type of banknote that is used only for deposit and not used for withdrawal, and the reflux banknote refers to a type of banknote that are used for both the deposit and withdrawal. The non-reflux banknote and the reflux banknote may be classified based on the amount of money according to the type of banknote. The reflux banknote may be set as a type of a relatively low-value banknote as compared to the non-reflux banknote, and the non-reflux banknote may be set as a type of a relatively high-value banknote as compared to the reflux banknote. For example, the reflux banknote may be used for change in the banknote deposit and withdrawal apparatus installed in retail markets such as convenience stores or large marts.

In this way, the deposit banknote discrimination section A does not have a separate module and has the plurality of sensors provided on the transportation path P1 so that the number of modules provided in the banknote deposit and withdrawal apparatus 100 may be reduced.

The temporary holding part 120 and the rejection part 130 are provided on both sides of a left side of the upper module 100a and have a drum-shaped structure including double-sided tapes, a drum for winding or rewinding together a banknote sandwiched therebetween, and a pair of reels for winding or rewinding the tapes. In this way, the temporary holding part 120 and the rejection part 130 have the drum-shaped structure, banknote storages having different functions may be provided in a left space of the upper module 100a, and thus space utilization may be improved.

The temporary holding part 120 has a drum-shaped structure and temporarily stores a banknote discriminated as the non-reflux banknote in the deposit banknote discrimination section A. Further, the temporary holding part 120 temporarily stores a withdrawal rejection banknote, which will be described below.

The rejection part 130 is provided on one side of the temporary holding part 120, has a drum-shaped structure, and temporarily stores the deposit rejection banknote that is discriminated as an abnormal banknote in the deposit banknote discrimination section A.

In this way, the separate temporary holding part 120 and the separate rejection part 130, which are separated from the banknote storage part 100b, are provided, the entire space of the banknote storage part 100b may be used as a space only for storing the banknote without the need to secure a separate space for temporarily holding and rejecting the banknote, and thus a banknote storage capacity in the banknote storage part 100b may increase.

The deposit-dedicated cassette 140 is provided below the temporary holding part 120, is used as a space which stores the non-reflux banknote, which is temporarily stored in the temporary holding part 120, transported thereto when the deposit is received, and is used as a space in which the banknote discriminated as the withdrawal rejection banknote is stored during the withdrawal, which will be described below.

Since the deposit-dedicated cassette 140 has only a deposit function and does not require a withdrawal function, a banknote collection part 141 may be provided on an inlet side of the deposit-dedicated cassette 140.

In this way, the deposit-dedicated cassette 140 is utilized as a space for storing the non-reflux banknote and the withdrawal rejection banknote, and thus, the number of modules for processing banknotes may be minimized, and functions may be integrated.

The plurality of reflux cassettes 150, 160, 170, and 180 are arranged in a vertically stacked structure at a lower side of the deposit-dedicated cassette 140, and the banknotes discriminated as the reflux banknotes in the deposit banknote discrimination section A are stored separately according to a banknote type. In the present embodiment, a structure is illustrated in which the plurality of reflux cassettes 150, 160, 170, and 180 are provided as first to fourth reflux cassettes 150, 160, 170, and 180 and thus can store four types of reflux banknotes. Further, banknote accumulation and separation parts 151, 161, 171, and 181 are respectively provided on inlet sides of the first to fourth reflux cassettes 150, 160, 170, and 180 to perform both the deposit function and the withdrawal function.

Further, the deposit-dedicated cassette 140 and the plurality of reflux cassettes 150, 160, 170, and 180 are vertically stacked and have a structure that is input into and output from a body of the banknote deposit and withdrawal apparatus 100 in a transverse direction, so that the overall height of the banknote deposit and withdrawal apparatus 100 may be lowered, and a volume occupied by the banknote deposit and withdrawal apparatus 100 may be reduced.

A withdrawal banknote discrimination section B that discriminates whether the withdrawal banknote is normal or abnormal by a plurality of sensors (not illustrated) is provided on the transportation path P4 through which the withdrawal banknotes withdrawn from the plurality of reflux cassettes 150, 160, 170, and 180 are transported. The banknote discriminated as the withdrawal rejection banknote in the withdrawal banknote discrimination section B is temporarily stored in the temporary holding part 120 and is transported to and stored in the deposit-dedicated cassette 140 after the normal banknote is completely withdrawn.

In this way, the withdrawal banknote discrimination section B does not have a separate module and has the plurality of sensors provided on the transportation path P4 so that the number of modules provided in the banknote deposit and withdrawal apparatus 100 may be reduced.

The sensors exemplified in the deposit banknote discrimination section A, two detection sensors, or the like may be used in the withdrawal banknote discrimination section B.

The sensors provided in the withdrawal banknote discrimination section B may have sensors on the transportation paths next to the first to fourth reflux cassettes 150, 160, 170, and 180 or may have only one sensor provided on the transportation sensor next to the first reflux cassette 150 or the deposit-dedicated cassette 140 and commonly used.

The transportation paths P1 to P10 include a first transportation path P1 which is provided in a transverse direction and through which the deposit banknote inserted into the deposit and withdrawal part 110 or the withdrawal banknote extracted from the deposit and withdrawal part 110, a second transportation path P2 connected to the rejection part 130 from the first transportation path P1, a third transportation path P3 branching off at a branching point between the first transportation path P1 and the second transportation path P2 and connected to the temporary holding part 120, a fourth transportation path P4 branching off from the third transportation path P3 and provided in a longitudinal direction to be connected to one sides of the deposit-dedicated cassette 140 and the plurality of reflux cassettes 150, 160, 170, and 180, a fifth transportation path P5 branching off from the fourth transportation path P4 and connected to the third transportation path P3 on one side of the temporary holding part 120, sixth to ninth transportation paths P6 to P9 branching off from the fourth transportation path P4 and connected to the one sides of the deposit-dedicated cassette 140 and the first to third reflux cassettes 150, 160, and 170, and a tenth transportation path P10 connected to the retraction part 190 from the deposit and withdrawal part 110.

Non-described numerals G1 to G6 denote banknote transportation direction switching gates that are rotatably provided at points from which the transportation paths branch off and change the transportation path of the banknote.

Hereinafter, a banknote processing operation in the banknote deposit and withdrawal apparatus 100 according to the present disclosure will be described with reference to FIGS. 2 to 8.

Referring to FIG. 2, during the deposit counting operation, the banknote inserted into the deposit and withdrawal part 110 is transported through the first transportation path P1, and the type and abnormality of the bank note are discriminated while the banknote passes through the deposit banknote discrimination section A.

During the deposit counting operation, the banknote discriminated as the deposit rejection banknote in the deposit banknote discrimination section A is transported to the rejection part 130 along the second transportation path P2 and is temporarily stored.

The banknote discriminated as the normal banknote and the non-reflux banknote in the deposit banknote discrimination section A is transported along the third transportation path P3 and is temporarily stored in the temporary holding part 120.

The banknote discriminated as the normal banknote and the reflux banknote in the deposit bank discrimination section A is transported along the fourth transportation path P4 and the seventh to ninth transportation paths P7, P8, and P9 and is stored in the plurality of reflux cassettes 150, 160, 170, and 180.

When the deposit counting operation for the normal banknote is completed, the deposit rejection banknote temporarily stored in the rejection part 130 is transported to the deposit and withdrawal part 110 along the second transportation path P2 and the first transportation path P1 and thus is received by the customer.

Referring to FIG. 3, when the reflux banknote is completely stored, the non-reflux banknote temporarily stored in the temporary holding part 120 is transported along the fifth transportation path P5, the fourth transportation path P4, and the sixth transportation path P6 and is stored in the deposit-dedicated cassette 140.

Referring to FIG. 4, when the customer selects deposit cancellation after the deposit counting operation, the non-reflux banknote temporarily stored in the temporary holding part 120 is transported to the deposit and withdrawal part 110 along the third transportation path P3 and the first transportation path P1, and the reflux banknote stored in the plurality of cassettes 150, 160, 170, and 180 is separated from the respective cassettes and then is transported to the deposit and withdrawal part 110 along the fourth transportation path P4, the third transportation path P3, and the first transportation path P1.

Referring to FIG. 5, during the withdrawal, the reflux banknote stored in the plurality of reflux cassettes 150, 160, 170, and 180 is separated from the respective cassettes and then is transported to the deposit and withdrawal part 110 along the fourth transportation path P4, the third transportation path P3, and the first transportation path P1. In this case, it is discriminated whether the withdrawal banknote passing through the withdrawal banknote discrimination section B is a normal banknote or a rejection banknote.

Referring to FIG. 6, the banknote discriminated as the withdrawal rejection banknote in the withdrawal banknote discrimination section B is transported along the fourth transportation path P4 and the fifth transportation path P5 and is temporarily stored in the temporary holding part 120. When the normal banknote is completely withdrawn, as illustrated in FIG. 7, the withdrawal rejection banknote temporarily stored in the temporary holding part 120 is transported along the fifth transportation path P5, the fourth transportation path P4, and the sixth transportation path P6 and is stored in the deposit-dedicated cassette 140.

Referring to FIG. 8, the untaken banknote, which is the banknote withdrawn to the deposit and withdrawal part 110 that is not taken by the customer, is transported along the tenth transportation path P10 and is stored in the retraction part 190.

Second Embodiment

Referring to FIG. 9, a banknote deposit and withdrawal apparatus 200 according to a second embodiment of the present disclosure includes an upper module 200a by which a banknote is deposited and withdrawn and a normal banknote and a rejection banknote are temporarily held and a banknote storage part 200b that is stacked under the upper module 100a and stores multi-currency banknotes while the banknotes are classified into non-reflux banknotes and reflux banknotes.

The upper module 200a includes a deposit and withdrawal part 210, a deposit banknote discrimination section C, a temporary holding part 220, and a rejection part 230.

The banknote storage part 200b has a structure in which a deposit-dedicated cassette 240 and a plurality of reflux cassettes 250, 260, and 270 are vertically stacked.

Further, transportation paths P11 to P18 connecting the components and providing paths through which a banknote is transported are included.

The deposit and withdrawal part 210 having a space, through which a banknote is inserted or received during the deposit and withdrawal, is provided in an integrated structure on a right side of the upper module 200a. The deposit and withdrawal part 210 may be provided with a space through which a deposit banknote is injected and a deposit rejection banknote is returned during the deposit and a withdrawal banknote is received during the withdrawal. In this way, the deposit and withdrawal part 210 may have an integrated deposit part and withdrawal part, perform a deposit operation and a withdrawal operation using one integrated module, and thus simplify a configuration of the apparatus. The deposit and withdrawal part 210 is provided with a banknote accumulation and separation part 211 for separating the deposit banknote one by one and accumulating the withdrawal banknote.

The deposit banknote discrimination section C discriminates the type and abnormality of the deposit banknote by a plurality of sensors (not illustrated) provided on the transportation path P11 through which the deposit banknote is transported, classifies the deposit banknote into a normal banknote and a rejection banknote according to the discrimination result, and classifies the normal banknote into the non-reflux banknote and the reflux banknote, which are transported to and stored in corresponding storages.

An optical sensor, a magnetic sensor, an ultraviolet sensor, or an infrared sensor may be used in the deposit banknote discrimination section C.

Here, the rejection banknote refers to a banknote that cannot be deposited and may include old banknotes, folded banknotes, counterfeit banknotes, doubt banknotes, and the like of which an image cannot be identified.

The non-reflux banknote refers to a type of banknote that is used only for deposit and not used for withdrawal, and the reflux banknote refers to a type of banknote that are used for both the deposit and withdrawal. The non-reflux banknote and the reflux banknote may be classified based on the amount of money according to the type of banknote. The reflux banknote may be set as a type of a relatively low-value banknote as compared to the non-reflux banknote, and the non-reflux banknote may be set as a type of a relatively high-value banknote as compared to the reflux banknote. For example, the reflux banknote may be used for change in the banknote deposit and withdrawal apparatus installed in the retail markets such as convenience stores or large marts.

In this way, the deposit banknote discrimination section C does not have a separate module and has the plurality of sensors provided on the transportation path P11 so that the number of modules provided in the banknote deposit and withdrawal apparatus 200 may be reduced.

The temporary holding part 220 and the rejection part 230 are provided on both sides of a left side of the upper module 200a and have a drum-shaped structure including double-sided tapes, a drum for winding or rewinding together a banknote sandwiched therebetween, and a pair of reels for winding or rewinding the tapes. In this way, the temporary holding part 220 and the rejection part 230 have the drum-shaped structure, banknote storages having different functions may be provided in a left space of the upper module 200a, and thus space utilization may be improved.

Further, the temporary holding part 220 and the rejection part 230 are disposed at both sides to be spaced apart from each other at the same height. Accordingly, the overall height of the banknote deposit and withdrawal apparatus 200 can be lowered, and the structures of the transportation paths P11, P12, and P13 connected to the temporary holding part 220 and the rejection part 230 can be simplified. That is, as the temporary holding part 220 and the rejection part 230 are disposed at both sides to be spaced apart from each other in an upper space of the $11^{th}$ transportation path P11, a length of the $12^{th}$ transportation path P2 connected to the temporary holding part 220 from the $11^{th}$ transportation path P11 and a length of the $13^{th}$ transportation path P13 connected to the rejection part 230 from the $11^{th}$ transportation path P11 may be implemented as short as possible. Thus, structures of the transportation paths are simplified, at the same time, the lengths of the transportation paths P11, P12, and P13 are reduced, and thus the overall height of the banknote deposit and withdrawal apparatus 200 may be low.

The temporary holding part 220 has a drum-shaped structure and temporarily stores the non-reflux banknote and the reflux banknote discriminated as a deposit normal banknote in the deposit banknote discrimination section C. Further, the temporary holding part 220 temporarily stores a withdrawal rejection banknote, which will be described below.

The rejection part 230 is provided on one side of the temporary holding part 220, has a drum-shaped structure, and temporarily stores the deposit rejection banknote that is discriminated as an abnormal banknote in the deposit banknote discrimination section C.

In this way, the separate temporary holding part 220 and the separate rejection part 230, which are separated from the banknote storage part 200b, are provided, the entire space of the banknote storage part 200b may be used as a space only for storing the banknote without the need to secure a separate space for temporarily holding and rejecting the banknote, and thus a banknote storage capacity in the banknote storage part 200b may increase.

The deposit-dedicated cassette 240 is provided below the temporary holding part 220, is used as a space for storing the non-reflux banknote temporarily stored in the temporary holding part 220 transported thereto when the deposit is received, and is used as a space in which the banknote discriminated as the withdrawal rejection banknote is stored during the withdrawal, which will be described below.

Since the deposit-dedicated cassette 240 has only a deposit function and does not require a withdrawal function, a banknote collection part 241 may be provided on an inlet side of the deposit-dedicated cassette 240.

In this way, the deposit-dedicated cassette 240 is utilized as a space for storing the non-reflux banknote and the withdrawal rejection banknote, and thus, the number of modules for processing banknotes may be minimized, and functions may be integrated.

The plurality of reflux cassettes 250, 260, and 270 are arranged in a vertically stacked structure at a lower side of the deposit-dedicated cassette 240, and the banknotes discriminated as the reflux banknotes in the deposit banknote discrimination section C are stored separately according to a banknote type. In the present embodiment, a structure is described in which the plurality of reflux cassettes 250, 260, and 270 are provided as first to third reflux cassettes 250, 260, and 270 and thus can store three types of reflux banknotes. Further, banknote accumulation and separation parts 251, 261, and 271 are respectively provided on inlet sides of the first to third reflux cassettes 250, 260, and 270 to perform both the deposit function and the withdrawal function.

Further, the deposit-dedicated cassette 240 and the plurality of reflux cassettes 250, 260, and 270 are vertically stacked and have a structure that is input into and output from a body of the banknote deposit and withdrawal apparatus 200 in a transverse direction, so that the overall height of the banknote deposit and withdrawal apparatus 200 may be lowered, and a volume occupied by the banknote deposit and withdrawal apparatus 100 may be reduced.

A withdrawal banknote discrimination section D that discriminates whether the withdrawal banknote is normal or abnormal by a plurality of sensors (not illustrated) is provided on the $15^{th}$ transportation path P15 through which the withdrawal banknotes withdrawn from the plurality of reflux cassettes 250, 260, and 270 are transported. The banknote discriminated as the withdrawal rejection banknote in the withdrawal banknote discrimination section D is temporarily stored in the temporary holding part 220 and is transported to and stored in the deposit-dedicated cassette 220 after the normal banknote is completely withdrawn.

In this way, the withdrawal banknote discrimination section D does not have a separate module and has the plurality of sensors provided on the $15^{th}$ transportation path P15 so that the number of modules provided in the banknote deposit and withdrawal apparatus 200 may be reduced.

The sensors exemplified in the deposit banknote discrimination section C, two detection sensors, or the like may be used in the withdrawal banknote discrimination section D.

The sensors provided in the withdrawal banknote discrimination section D may have sensors on the transportation paths next to the first to third reflux cassettes 250, 260, and 270 or may have only one sensor provided on the transportation sensor next to the first reflux cassette 250 or the deposit-dedicated cassette 240 and commonly used.

The transportation paths P11 to P18 may include a $11^{th}$ transportation path P11 through which the deposit banknote inserted into the deposit and withdrawal part 210 or the withdrawn banknote extracted from the deposit and withdrawal part 210 is transported and which is provided in a transverse direction, a $12^{th}$ transportation path P12 connected to the temporary holding part 220 from the $11^{th}$ transportation path P11, a $13^{th}$ transportation path P13 branching off at a branching point between the $11^{th}$ transportation path P11 and the $12^{th}$ transportation path P12, a $14^{th}$ transportation path P14 branching off at a branching point between the $11^{th}$ transportation path P11 and the $13^{th}$ transportation path P13 and connected to the temporary holding part 220, a $15^{th}$ transportation path P15 branching off from the $13^{th}$ transportation path P13 and provided in a longitudinal direction to be connected to sides of the deposit-dedicated cassette 240 and the plurality of reflux cassettes 250, 260, and 270, and $16^{th}$ to $18^{th}$ transportation paths P16 to P18 branching off from the $15^{th}$ transportation path P15 and connected to sides of the deposit-dedicated cassette 240 and the first to third reflux cassettes 250, 260, and 270.

Non-described numerals G11 to G15 denote banknote transportation direction switching gates that are rotatably provided at points from which the transportation paths branch off and change the transportation path of the banknote.

Hereinafter, a banknote processing operation in the banknote deposit and withdrawal apparatus 200 according to an embodiment of the present disclosure will be described with reference to FIGS. 10 to 17.

Referring to FIG. 10, during the deposit counting operation, the banknote inserted into the deposit and withdrawal part 210 and transported along the $11^{th}$ transportation path P11 is discriminated as the deposit normal banknote or the deposit rejection banknote while passing through the deposit banknote discrimination section C, and at the same time, the deposit normal banknote is discriminated as a reflux banknote or a non-reflux banknote.

During the deposit counting operation, the banknote discriminated as the deposit normal banknote in the deposit banknote discrimination section C is transported along the $12^{th}$ transportation path P12 and is temporarily stored in the temporary holding part 220. The deposit normal banknote may include the non-reflux banknote and the reflux banknote.

The banknote discriminated as the deposit rejection banknote in the deposit banknote discrimination section C is transported to the rejection part 230 along the $13^{th}$ transportation path P13 and is temporarily stored.

Referring to FIG. 11, when the deposit counting operation is completed, the deposit rejection banknote temporarily stored in the rejection part 230 is transported to the deposit and withdrawal part 210 along the $13^{th}$ transportation path P13 and the $11^{th}$ transportation path P11 and thus is received by the customer.

Referring to FIG. 12, when the customer cancels the deposit after the deposit counting operation, the deposit normal banknote temporarily stored in the temporary holding part 220 is transported to the deposit and withdrawal part 210 along the $12^{th}$ transportation path P12 and the $11^{th}$ transportation path P11 and thus is received by the customer.

Referring to FIG. 13, when the deposit is received, the non-reflux banknote temporarily stored in the temporary holding part 220 may be transported along the $14^{th}$ transportation path P14 and the $15^{th}$ transportation path P15 and may be stored in the deposit-dedicated cassette 240, and the reflux banknote temporarily stored in the temporary holding part 220 may be transported along the $14^{th}$ transportation path P14, the $15^{th}$ transportation path P15, and the $16^{th}$ to $18^{th}$ transportation paths P16 to P18 and may separately be stored in the plurality of reflux cassettes 250, 260, and 270 according to the type of banknote.

Referring to FIG. 14, during the withdrawal, the reflux banknote stored in the plurality of reflux cassettes 250, 260, and 270 is separated from the respective cassettes, and whether the reflux banknote is the withdrawal normal banknote or the withdrawal rejection banknote is discriminated while the banknote passes through the withdrawal banknote discrimination section D.

The banknote discriminated as the withdrawal normal banknote in the withdrawal banknote discrimination section D is transported to the deposit and withdrawal part 210 along the $15^{th}$ transportation path P15 and the $11^{th}$ transportation path P11.

Referring to FIG. 15, the banknote discriminated as the withdrawal rejection banknote in the withdrawal banknote discrimination section D, for example, a long length banknote transported while two banknotes overlap each other or a short interval banknote in which an interval between banknotes sequentially transported is smaller than a set interval, is transported along the $15^{th}$ transportation path P15 and the $14^{th}$ transportation path P14, is temporarily stored in the temporary holding part 220, and is transported to and stored in the deposit-dedicated cassette 240 after the withdrawal normal banknote is completely withdrawn.

FIGS. 15 and 16 illustrate operations of identifying the number of withdrawal rejection banknotes temporarily stored in the temporary holding part 220. When the withdrawal rejection banknote is processed, the withdrawal rejection banknotes temporarily stored in the temporary holding part 220 may be transported to the deposit and withdrawal part 210 along the 12$^{th}$ transportation path P12 and the 11$^{th}$ transportation path P11, may be separated from the deposit and withdrawal part 210 by the banknote accumulation and separation part 211 one by one, may be counted while passing through the deposit banknote discrimination section C along the 11$^{th}$ transportation path P11, may be transported along the 15$^{th}$ transportation path P15, and then may be stored in the deposit-dedicated cassette 240.

The withdrawal rejection banknote temporarily stored in the temporary holding part 220 may include a long length medium in which two banknotes overlap each other. In a state in which two withdrawal rejection banknotes temporarily stored in the temporary holding part 220 overlap each other, after the number of the banknotes is counted while the banknotes pass through the withdrawal banknote discrimination section D along the 15$^{th}$ transportation path P15, when the banknotes are directly transported to the deposit-dedicated cassette 240, two media passing through the withdrawal banknote discrimination section D overlap each other, and thus the number of media cannot be accurately identified.

In contrast, in the present embodiment, when the withdrawal rejection banknotes are processed after the withdrawal rejection banknotes are temporarily stored in the temporary holding part 220, the withdrawal rejection banknotes extracted from the temporary holding part 220 are transported to the deposit and withdrawal part 210, are separated from the deposit and withdrawal part 210 one by one, are counted in parts of sheets while passing through the deposit banknote discrimination section C, and then are transported to the deposit-dedicated cassette 240. Thus, the number of the withdrawal rejection banknote can be accurately identified, so that operational convenience of the banknote deposit and withdrawal apparatus 200 can be improved.

Third Embodiment

Referring to FIG. 18, a banknote deposit and withdrawal apparatus 200-1 according to a third embodiment of the present disclosure includes all the components of the banknote deposit and withdrawal apparatus 200 according to the above-described embodiments, and there is a difference in that some components are added thereto.

In the present embodiment, the deposit-dedicated cassette 240 and the reflux cassettes 250, 260, and 270 are stored inside a safe 280, a transit cassette 290 for performing at least one function of replenishment, collection, and settlement of the banknote between the deposit-dedicated cassette 240 and the reflux cassettes 250, 260, and 270 is provided outside the safe 280, and the transportation path includes a transit transportation path P19 connecting the deposit-dedicated cassette 240, the reflux cassettes 250, 260, and 270, and the transit cassette 290 and connected to the 11th transportation path P11 so that the banknote is transported.

According to a configuration of the banknote deposit and withdrawal apparatus 200-1, even in a state in which the safe 280 is not open, a transit function such as replenishment, collection, and settlement of the banknote may be additionally performed, and thus the banknote deposit and withdrawal apparatus 200-1 can be utilized not only in the retail markets but also in financial institutions such as banks that require the transit function.

According to a banknote deposit and withdrawal apparatus according to the present disclosure, a banknote processing operation is performed after a reflux banknote and a non-reflux banknote are separated, a structure of the banknote deposit and withdrawal apparatus may be simplified, and thus manufacturing costs may be reduced. Further, the banknote deposit and withdrawal apparatus can handle a plurality of types of banknotes, and thus is suitable for installation and use in retail markets such as convenience stores or large marts.

Further, a separate temporary holding part and a separate rejection part separated from a banknote storage part is provided, and thus a banknote storage capacity of the banknote storage part may increase.

In this way, a deposit part and a withdrawal part are integrated, a deposit operation and a withdrawal operation can be performed using one module, and thus a configuration of the banknote deposit and withdrawal apparatus can be simplified.

Further, a deposit banknote discrimination section and a withdrawal banknote discrimination section are not formed as separate modules, a banknote is discriminated by arranging a sensor on a transportation path, and thus the number of modules provided in the banknote deposit and withdrawal apparatus may be reduced.

Further, the temporary holding part is utilized as a space in which a non-reflux deposit banknote is temporarily stored and a space in which a withdrawal rejection banknote is temporarily stored, and thus the number of modules for banknote processing can be minimized, and functions can be integrated.

Further, a retraction part is provided in a lower space of the deposit and withdrawal part and thus can be utilized as a space in which an untaken banknote is collected and stored.

Further, the temporary holding part and the rejection part are disposed at both sides to be spaced apart from each other at the same height, and thus the overall height of the banknote deposit and withdrawal apparatus can be reduced, and a structure of the transportation path connected to the temporary holding part and the rejection part can be simplified.

Further, when the withdrawal rejection banknote is processed after the withdrawal rejection banknote is temporarily stored in the temporary holding part, the withdrawal rejection banknote extracted from the temporary holding part is transported to the deposit and withdrawal part, is separated from the deposit and withdrawal part one by one, is counted while passing through the deposit banknote discrimination section, and then is transported to a deposit-dedicated cassette. Thus, the number of withdrawal rejection banknotes can be accurately identified so that operational convenience of the banknote deposit and withdrawal apparatus can be improved.

Further, a transportation path for performing a transit function is added to a lower portion of the deposit and withdrawal part, and a transit cassette is detachably provided outside the safe. Thus, even in a state in which the safe is not open, a transit function such as replenishment, collection, and settlement of the banknote may be additionally performed, and thus the banknote deposit and withdrawal apparatus can be utilized not only in the retail markets but also in financial institutions such as banks that require the transit function.

As described above, the present disclosure is not limited to the above-described embodiments, obvious modifications could be made by those skilled in the art to which the present disclosure pertains without departing from the technical spirit of the present disclosure claimed by the appended claims, and the obvious modifications belong to the scope of the present disclosure.

What is claimed is:

1. A banknote deposit and withdrawal apparatus comprising:
    a deposit and withdrawal part having a space through which a banknote is inserted or received during deposit and withdrawal;
    a deposit banknote discrimination section configured to discriminate a type and abnormality of a deposit banknote by a plurality of sensors provided on a transportation path along which the banknote deposited through the deposit and withdrawal part is transported;
    a temporary holding part provided on one side of the deposit and withdrawal part and having a drum-shaped structure in which the banknote discriminated as a non-reflux banknote in the deposit banknote discrimination section is temporarily stored;
    a rejection part provided on one side of the temporary holding part and having a drum-shaped structure in which the banknote discriminated as a deposit rejection banknote in the deposit banknote discrimination section is temporarily stored;
    a deposit-dedicated cassette which store the non-reflux banknote, which is temporarily stored in the temporary holding part, transported thereto when the deposit is received;
    a plurality of reflux cassettes which are stacked at a lower side of the deposit-dedicated cassette and in which the banknote discriminated as a reflux banknote in the deposit banknote discrimination section is stored separately according to the type of the banknote; and
    the transportation path along which the deposited or withdrawn banknote is transported;
    wherein the transportation path includes:
    a first transportation path along which the deposit banknote inserted into the deposit and withdrawal part or a withdrawal banknote extracted from the deposit and withdrawal part is transported and which is provided in a transverse direction;
    a second transportation path connected to the rejection part from the first transportation path;
    a third transportation path branching off at a branching point between the first transportation path and the second transportation path and connected to the temporary holding part;
    a fourth transportation path branching off from the third transportation path and provided in a longitudinal direction to be connected to one sides of the deposit-dedicated cassette and the plurality of reflux cassettes; and
    a fifth transportation path branching off from the fourth transportation path and connected to the third transportation path on one side of the temporary holding part.

2. The banknote deposit and withdrawal apparatus of claim 1, further comprising:
    a withdrawal banknote discrimination section configured to discriminate whether a withdrawal banknote withdrawn from the plurality of reflux cassettes is abnormal by the plurality of sensors on the transportation path along which the withdrawal banknote is transported,
    wherein the banknote discriminated as a withdrawal rejection banknote in the withdrawal banknote discrimination section is temporarily stored in the temporary holding part and is transported to and stored in the deposit-dedicated cassette after a normal banknote is completely withdrawn.

3. The banknote deposit and withdrawal apparatus of claim 1, wherein, during a deposit counting operation, the banknote inserted into the deposit and withdrawal part and transported through the first transportation path is classified into a reflux banknote and a non-reflux banknote,
    the banknote discriminated as the non-reflux banknote in the deposit banknote discrimination section is transported along the third transportation path and is temporarily stored in the temporary holding part,
    the banknote discriminated as the reflux banknote in the deposit banknote discrimination section is transported along the third transportation path and the fourth transportation path and is stored in the plurality of reflux cassettes, and
    when the reflux banknote is completely stored, the non-reflux banknote temporarily stored in the temporary holding part is transported along the fifth transportation path and the fourth transportation path and is stored in the deposit-dedicated cassette.

4. The banknote deposit and withdrawal apparatus of claim 1, wherein, during a deposit counting operation, the banknote discriminated as the deposit rejection banknote in the deposit banknote discrimination section is transported along the second transportation path and is temporarily stored in the rejection part, and
    after the deposit counting operation is completed, the deposit rejection banknote temporarily stored in the rejection part is transported along the second transportation path and the first transportation path to the deposit and withdrawal part.

5. The banknote deposit and withdrawal apparatus of claim 1, further comprising a withdrawal banknote discrimination section configured to discriminate whether the withdrawal banknote withdrawn from the plurality of reflux cassettes is abnormal by the plurality of sensors on the transportation path along which the withdrawal banknote is transported,
    wherein, when the banknote is withdrawn from the plurality of reflux cassettes, the banknote discriminated as a withdrawal rejection banknote in the withdrawal banknote discrimination section is transported along the fourth transportation path and the fifth transportation path and is temporarily stored in the temporary holding part, and
    when a normal banknote is completely withdrawn, the withdrawal rejection banknote temporarily stored in the temporary holding part is transported along the fifth transportation path and the fourth transportation path and is store in the deposit-dedicated cassette.

6. The banknote deposit and withdrawal apparatus of claim 1, wherein a retraction part, in which the banknote that is withdrawal to the deposit and withdrawal part and then is not received is collected and stored, is provided below the deposit and withdrawal part.

7. The banknote deposit and withdrawal apparatus of claim 1, wherein the deposit-dedicated cassette and the reflux cassette are accommodated in a safe,
    a transit cassette configured to perform at least one function of replenishment, collection, and settlement of the banknote between the deposit-dedicated cassette and the reflux cassette is provided outside the safe, and the transportation path includes a transit transportation path which connects the deposit-dedicated cassette and the reflux cassette and the transit cassette and through which the banknote is transported.

8. The banknote deposit and withdrawal apparatus of claim 1, wherein the reflux banknote is set as a type of a relatively low-value banknote as compared to the non-reflux banknote, and the non-reflux banknote is set as a type of a relatively high-value banknote as compared to the reflux banknote.

9. The banknote deposit and withdrawal apparatus of claim 1, wherein the deposit-dedicated cassette and the plurality of reflux cassettes are vertically stacked and are extracted or received in a transverse direction.

10. A banknote deposit and withdrawal apparatus comprising:

a deposit and withdrawal part having a space through which a banknote is inserted or received during deposit and withdrawal;

a deposit banknote discrimination section configured to discriminate a type and abnormality of a deposit banknote by a plurality of sensors provided on a transportation path along which the banknote deposited through the deposit and withdrawal part is transported;

a temporary holding part provided on one side of the deposit and withdrawal part and having a drum-shaped structure in which the banknote discriminated as a non-reflux banknote in the deposit banknote discrimination section is temporarily stored;

a rejection part provided on one side of the temporary holding part and having a drum-shaped structure in which the banknote discriminated as a deposit rejection banknote in the deposit banknote discrimination section is temporarily stored;

a deposit-dedicated cassette which store the non-reflux banknote, which is temporarily stored in the temporary holding part, transported thereto when the deposit is received;

a plurality of reflux cassettes which are stacked at a lower side of the deposit-dedicated cassette and in which the banknote discriminated as a reflux banknote in the deposit banknote discrimination section is stored separately according to the type of the banknote; and the transportation path along which the deposited or withdrawn banknote is transported;

wherein the temporary holding part temporarily stores the non-reflux banknote and the reflux banknote discriminated as a deposit normal banknote in the deposit banknote discrimination section, and when the deposit is received, the reflux banknote among the deposit normal banknote temporarily stored in the temporary holding part is transported to the plurality of reflux cassettes and is stored in the plurality of reflux cassettes according to the type of the banknote; and wherein the transportation path includes:

an $11^{th}$ transportation path along which the deposit banknote inserted into the deposit and withdrawal part or a withdrawal banknote extracted from the deposit and withdrawal part is transported and which is provided in a transverse direction;

a $12^{th}$ transportation path connected to the temporary holding part from the $11^{th}$ transportation path;

a $13^{th}$ transportation path branching off at a branching point between the $11^{th}$ transportation path and the $12^{th}$ transportation path and connected to the rejection part;

a $14^{th}$ transportation path branching off at a branching point between the $11^{th}$ transportation path and the $13^{th}$ transportation path and connected to the temporary holding part; and a $15^{th}$ transportation path branching off from the $13^{th}$ transportation path and provided in a longitudinal direction to be connected to one side of the deposit-dedicated cassette and one side of the plurality of reflux cassettes.

11. The banknote deposit and withdrawal apparatus of claim 10, wherein the temporary holding part and the rejection part are disposed at both sides to be spaced apart from each other at the same height.

12. The banknote deposit and withdrawal apparatus of claim 10, comprising a withdrawal banknote discrimination section configured to discriminate whether a withdrawal banknote withdrawn from the plurality of reflux cassettes is abnormal by the plurality of sensors on the transportation path along which the withdrawal banknote is transported, wherein the banknote discriminated as a withdrawal rejection banknote in the withdrawal banknote discrimination section is temporarily stored in the temporary holding part and is transported to and stored in the deposit-dedicated cassette after a withdrawal normal banknote is completely withdrawn, and when the withdrawal rejection banknote is processed, the withdrawal rejection banknote temporarily stored in the temporary holding part is extracted from the temporary holding part, is transported to the deposit and withdrawal part, is separated from the deposit and withdrawal part one by one, passes through the deposit banknote discrimination section, and then is transported to and stored in the deposit-dedicated cassette after the number of withdrawal rejection banknotes is counted.

13. The banknote deposit and withdrawal apparatus of claim 10, wherein, during a deposit counting operation, the banknote inserted into the deposit and withdrawal part and transported along the $11^{th}$ transportation path is discriminated as a deposit normal banknote or a deposit rejection banknote while passing through the deposit banknote discrimination section, and at the same time, the deposit normal banknote is discriminated as a reflux banknote and a non-reflux banknote, the banknote discriminated as the deposit normal banknote in the deposit banknote discrimination section is transported along the $12^{th}$ transportation path and is temporarily stored in the temporary holding part, and the banknote discriminated as the deposit rejection banknote in the deposit banknote discrimination section is transported along the $13^{th}$ transportation path and is temporarily stored in the rejection part.

14. The banknote deposit and withdrawal apparatus of claim 13, wherein when the deposit is rejected, the deposit rejection banknote temporarily stored in the rejection part is transported along the $13^{th}$ transportation path and the $11^{th}$ transportation path to the deposit and withdrawal part after the deposit counting operation is completed, and when the deposit is received, the non-reflux banknote temporarily stored in the temporary holding part is transported along the $14^{th}$ transportation path and the $15^{th}$ transportation path and stored in the deposit-dedicated cassette, and the reflux banknote temporarily stored in the temporary holding part is transported along the 14$^{th}$ transportation path and the 15$^{th}$ transportation path and is stored separately according to a type of the banknote.

15. The banknote deposit and withdrawal apparatus of claim 10, further comprising a withdrawal banknote discrimination section configured to discriminate whether the withdrawal banknote withdrawn from the plurality of reflux cassettes is abnormal by a plurality of sensors on the transportation path along which the withdrawal banknote is transported,
  wherein, when the banknote is withdrawn from the plurality of reflux cassettes,
  the banknote discriminated as a withdrawal normal banknote in the withdrawal banknote discrimination section is transported along the 15$^{th}$ transportation path and the 11$^{th}$ transportation path and is withdrawn to the deposit and withdrawal part, and
  the banknote discriminated as a withdrawal rejection banknote in the withdrawal banknote discrimination section is transported along the 15$^{th}$ transportation path and the 14$^{th}$ transportation path and is temporarily stored in the temporary holding part.

16. The banknote deposit and withdrawal apparatus of claim 15, wherein, when the withdrawal normal banknote is completely withdrawn, the withdrawal rejection banknote temporarily stored in the temporary holding part is transported along the 14$^{th}$ transportation path and the 15$^{th}$ transportation path and is stored in the deposit-dedicated cassette.

17. The banknote deposit and withdrawal apparatus of claim 15, wherein, when the withdrawal normal banknote is completely withdrawn, the withdrawal rejection banknote temporarily stored in the temporary holding part is transported to the deposit and withdrawal part along the 12$^{th}$ transportation path and the 11$^{th}$ transportation path, is separated from the deposit and withdrawal part one by one, passes through the deposit banknote discrimination section along the 11$^{th}$ transportation path, is transported along the 15$^{th}$ transportation path after the number of withdrawal rejection banknotes is counted, and then is stored in the deposit-dedicated cassette.

\* \* \* \* \*